US012105480B2

(12) United States Patent
Perkins et al.

(10) Patent No.: US 12,105,480 B2
(45) Date of Patent: *Oct. 1, 2024

(54) CROWN FOR AN ELECTRONIC WATCH

(71) Applicant: Apple Inc., Cupertino, CA (US)

(72) Inventors: Ryan C. Perkins, San Francisco, CA (US); Maegan K. Spencer, Emerald Hills, CA (US); Brad G. Boozer, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,660

(22) Filed: Aug. 10, 2023

(65) Prior Publication Data

US 2023/0393536 A1 Dec. 7, 2023

Related U.S. Application Data

(63) Continuation of application No. 17/838,247, filed on Jun. 12, 2022, now Pat. No. 11,754,981, which is a continuation of application No. 16/408,774, filed on May 10, 2019, now Pat. No. 11,360,440.

(60) Provisional application No. 62/689,775, filed on Jun. 25, 2018.

(51) Int. Cl.
*G04G 21/08* (2010.01)
*G01D 5/347* (2006.01)

(52) U.S. Cl.
CPC ........... *G04G 21/08* (2013.01); *G01D 5/3473* (2013.01)

(58) Field of Classification Search
CPC ........ G04G 21/08; G04G 21/00; G04C 3/008; G04C 3/004; G04C 3/007; G01D 5/3473; G01D 5/2412; G06F 3/0362; G06F 3/0346; H03K 17/975; H03K 2217/960755
USPC .......................................................... 368/69
See application file for complete search history.

(56) References Cited

U.S. PATENT DOCUMENTS

| | | | |
|---|---|---|---|
| 2,237,860 | A | 4/1941 | Bolle |
| 2,288,215 | A | 6/1942 | Taubert et al. |
| 2,497,935 | A | 2/1950 | Feurer |
| 2,771,734 | A | 11/1956 | Morf |
| 2,788,236 | A | 4/1957 | Kafowi |

(Continued)

FOREIGN PATENT DOCUMENTS

| | | |
|---|---|---|
| CH | 1888928 | 1/1937 |
| CH | 706101 | 8/2013 |

(Continued)

OTHER PUBLICATIONS

Author Unknown, "Desirable Android Wear smartwatch from LG," Gulf News, Dubai, 3 pages, Jan. 30, 2015.

(Continued)

*Primary Examiner* — Edwin A. Leon
(74) *Attorney, Agent, or Firm* — Brownstein Hyatt Farber Schreck, LLP

(57) ABSTRACT

An electronic watch includes a housing, a display positioned at least partially within the housing, a cover covering at least part of the display, and a crown having a portion positioned along a side of the housing. The crown may include an inner member that is rotationally constrained relative to the housing and an outer member that is rotationally free relative to the inner member. The device may further include a rotation sensor configured to sense a rotation of the outer member relative to the inner member.

20 Claims, 15 Drawing Sheets

(56) References Cited

U.S. PATENT DOCUMENTS

| | | |
|---|---|---|
| 2,797,592 A | 7/1957 | Marrapese |
| 3,040,514 A | 6/1962 | Dinstman |
| 3,056,030 A | 9/1962 | Kelchner |
| 3,130,539 A | 4/1964 | Davis |
| 3,355,873 A | 12/1967 | Morf |
| 3,362,154 A | 1/1968 | Perret |
| 3,410,247 A | 11/1968 | Dronberger |
| 3,495,398 A | 2/1970 | Widmer et al. |
| 3,577,876 A | 5/1971 | Spadini |
| 3,621,649 A | 11/1971 | Vulcan et al. |
| 3,662,618 A | 5/1972 | Kroll et al. |
| 3,733,803 A | 5/1973 | Hiraga |
| 3,937,002 A | 2/1976 | Van Haften |
| 4,007,347 A | 2/1977 | Haber |
| 4,031,341 A | 6/1977 | Wuthrich et al. |
| 4,037,068 A | 7/1977 | Gaynor |
| 4,051,665 A | 10/1977 | Arn |
| 4,077,200 A | 3/1978 | Schneider |
| 4,133,404 A | 1/1979 | Griffin |
| 4,170,104 A | 10/1979 | Yamagata |
| 4,203,280 A | 5/1980 | Ziegler |
| 4,258,096 A | 3/1981 | LaMarche |
| 4,274,152 A | 6/1981 | Ikegami |
| 4,287,400 A | 9/1981 | Kitik |
| 4,289,400 A | 9/1981 | Kubola et al. |
| 4,311,026 A | 1/1982 | Ochoa |
| 4,311,990 A | 1/1982 | Burke |
| 4,324,956 A | 4/1982 | Sakakino et al. |
| 4,345,119 A | 8/1982 | Latasiewicz |
| 4,364,674 A | 12/1982 | Tesch |
| 4,379,642 A | 4/1983 | Meyrat |
| 4,395,134 A | 7/1983 | Luce |
| 4,396,298 A | 8/1983 | Ripley |
| 4,417,824 A | 11/1983 | Paterson et al. |
| 4,448,199 A | 5/1984 | Schmid |
| 4,520,306 A | 5/1985 | Kirby |
| 4,581,509 A | 4/1986 | Sanford et al. |
| 4,600,316 A | 7/1986 | Besson |
| 4,617,461 A | 10/1986 | Subbarao et al. |
| 4,634,861 A | 1/1987 | Ching et al. |
| 4,641,026 A | 2/1987 | Garcia, Jr. |
| 4,670,737 A | 6/1987 | Rilling |
| 4,766,642 A | 8/1988 | Gaffney et al. |
| 4,783,772 A | 11/1988 | Umemoto et al. |
| 4,884,073 A | 11/1989 | Souloumiac |
| 4,914,831 A | 4/1990 | Kanezashi et al. |
| 4,922,070 A | 5/1990 | Dorkinski |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,001,687 A | 3/1991 | Brien |
| 5,034,602 A | 7/1991 | Garcia et al. |
| 5,177,355 A | 1/1993 | Branan |
| 5,214,278 A | 5/1993 | Banda |
| 5,258,592 A | 11/1993 | Nishikawa et al. |
| 5,288,993 A | 2/1994 | Bidiville et al. |
| 5,347,123 A | 9/1994 | Jackson et al. |
| 5,383,166 A | 1/1995 | Gallay |
| 5,471,054 A | 11/1995 | Watanabe |
| 5,477,508 A | 12/1995 | Will |
| 5,509,174 A | 4/1996 | Worrell |
| 5,559,761 A | 9/1996 | Frenkel et al. |
| 5,572,314 A | 11/1996 | Hyman et al. |
| 5,583,560 A | 12/1996 | Florin et al. |
| 5,631,881 A | 5/1997 | Pessey et al. |
| 5,726,645 A | 3/1998 | Kamon et al. |
| 5,738,104 A | 4/1998 | Lo |
| 5,748,111 A | 5/1998 | Bates |
| 5,825,353 A | 10/1998 | Will |
| 5,841,050 A | 11/1998 | Clift et al. |
| 5,847,335 A | 12/1998 | Sugahara et al. |
| 5,867,082 A | 2/1999 | Van Zeeland |
| 5,943,233 A | 8/1999 | Ebina |
| 5,953,001 A | 9/1999 | Challener et al. |
| 5,960,366 A | 9/1999 | Duwaer et al. |
| 5,963,332 A | 10/1999 | Feldman et al. |
| 5,999,168 A | 12/1999 | Rosenberg et al. |
| 6,069,567 A | 5/2000 | Zawilski |
| 6,128,006 A | 10/2000 | Rosenberg et al. |
| 6,134,189 A | 10/2000 | Carrard |
| 6,154,201 A | 11/2000 | Levin et al. |
| 6,175,679 B1 | 1/2001 | Veligdan et al. |
| 6,203,190 B1 | 3/2001 | Stotz |
| 6,241,684 B1 | 6/2001 | Amano |
| 6,246,050 B1 | 6/2001 | Tullis et al. |
| 6,252,825 B1 | 6/2001 | Perotto |
| 6,304,247 B1 | 10/2001 | Black |
| 6,355,891 B1 | 3/2002 | Ikunami |
| 6,361,502 B1 | 3/2002 | Puolakanaho et al. |
| 6,377,239 B1 | 4/2002 | Isikawa |
| 6,392,640 B1 | 5/2002 | Will |
| 6,396,006 B1 | 5/2002 | Yokoji et al. |
| 6,422,740 B1 | 7/2002 | Leuenberger |
| 6,477,117 B1 | 11/2002 | Narayanaswami et al. |
| 6,502,982 B1 | 1/2003 | Bach et al. |
| 6,525,278 B2 | 2/2003 | Villain et al. |
| 6,556,222 B1 | 4/2003 | Narayanaswami |
| 6,575,618 B1 | 6/2003 | Inoue et al. |
| 6,587,400 B1 | 7/2003 | Line |
| 6,636,197 B1 | 10/2003 | Goldenberg et al. |
| 6,646,635 B2 | 11/2003 | Pogatetz et al. |
| 6,661,438 B1 | 11/2003 | Shiraishi et al. |
| 6,672,758 B2 | 1/2004 | Ehrsam et al. |
| 6,721,540 B1 | 4/2004 | Hayakawa |
| 6,794,992 B1 | 9/2004 | Rogers |
| 6,809,275 B1 | 10/2004 | Cheng et al. |
| 6,834,430 B2 | 12/2004 | Worrell |
| 6,846,998 B2 | 1/2005 | Hasumi et al. |
| 6,882,596 B2 | 4/2005 | Guanter |
| 6,888,076 B2 | 5/2005 | Hetherington |
| 6,896,403 B1 | 5/2005 | Gau |
| 6,909,378 B1 | 6/2005 | Lambrechts et al. |
| 6,914,551 B2 | 7/2005 | Vidal |
| 6,950,695 B2 | 9/2005 | Chen |
| 6,961,099 B2 | 11/2005 | Takano et al. |
| 6,963,039 B1 | 11/2005 | Weng et al. |
| 6,967,903 B2 | 11/2005 | Guanter |
| 6,977,868 B2 | 12/2005 | Brewer et al. |
| 6,982,930 B1 | 1/2006 | Hung |
| 6,985,107 B2 | 1/2006 | Anson |
| 6,987,568 B2 | 1/2006 | Dana |
| 6,998,553 B2 | 2/2006 | Hisamune et al. |
| 7,009,915 B2 | 3/2006 | Brewer et al. |
| 7,016,263 B2 | 3/2006 | Gueissaz et al. |
| 7,021,442 B2 | 4/2006 | Borgerson |
| 7,031,228 B2 | 4/2006 | Born et al. |
| 7,034,237 B2 | 4/2006 | Ferri et al. |
| 7,081,905 B1 | 7/2006 | Raghunath et al. |
| 7,102,626 B2 | 9/2006 | Denny, III |
| 7,106,307 B2 | 9/2006 | Cok |
| 7,111,365 B1 | 9/2006 | Howie, Jr. |
| 7,113,450 B2 | 9/2006 | Plancon et al. |
| 7,119,289 B2 | 10/2006 | Lacroix |
| 7,135,673 B2 | 11/2006 | Saint Clair |
| 7,167,083 B2 | 1/2007 | Giles |
| 7,187,359 B2 | 3/2007 | Numata |
| 7,244,927 B2 | 7/2007 | Huynh |
| 7,255,473 B2 | 8/2007 | Hiranuma et al. |
| 7,265,336 B2 | 9/2007 | Hataguchi et al. |
| 7,274,303 B2 | 9/2007 | Dresti et al. |
| 7,285,738 B2 | 10/2007 | Lavigne et al. |
| 7,286,063 B2 | 10/2007 | Gauthey |
| 7,292,741 B2 | 11/2007 | Ishiyama et al. |
| 7,358,481 B2 | 4/2008 | Yeoh et al. |
| 7,369,308 B2 | 5/2008 | Tsuruta et al. |
| 7,371,745 B2 | 5/2008 | Ebright et al. |
| 7,385,874 B2 | 6/2008 | Vuilleumier |
| 7,404,667 B2 | 7/2008 | Born et al. |
| 7,465,917 B2 | 12/2008 | Chin et al. |
| 7,468,036 B1 | 12/2008 | Rulkov et al. |
| 7,474,592 B2 | 1/2009 | Lyon |
| 7,506,269 B2 | 3/2009 | Lang et al. |
| 7,520,664 B2 | 4/2009 | Wai |

(56) References Cited

U.S. PATENT DOCUMENTS

| | | |
|---|---|---|
| 7,528,824 B2 | 5/2009 | Kong |
| 7,545,367 B2 | 6/2009 | Sunda et al. |
| 7,557,795 B2 | 7/2009 | Kong et al. |
| 7,591,582 B2 | 9/2009 | Hiranuma et al. |
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |
| 7,655,874 B2 | 2/2010 | Akieda |
| 7,682,070 B2 | 3/2010 | Burton |
| 7,708,457 B2 | 5/2010 | Girardin |
| 7,710,456 B2 | 5/2010 | Koshiba et al. |
| 7,732,724 B2 | 6/2010 | Otani et al. |
| 7,761,246 B2 | 7/2010 | Matsui |
| 7,763,819 B2 | 7/2010 | Ieda et al. |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,587 B2 | 9/2010 | Kosugi |
| 7,791,588 B2 | 9/2010 | Tierling et al. |
| 7,791,597 B2 | 9/2010 | Silverstein et al. |
| 7,822,469 B2 | 10/2010 | Lo |
| 7,856,255 B2 | 12/2010 | Tsuchiya et al. |
| 7,858,583 B2 | 12/2010 | Schmidt et al. |
| 7,865,324 B2 | 1/2011 | Lindberg |
| 7,894,957 B2 | 2/2011 | Carlson |
| 7,946,758 B2 | 5/2011 | Mooring |
| 8,063,892 B2 | 11/2011 | Shahoian et al. |
| 8,138,488 B2 | 3/2012 | Grot |
| 8,143,981 B2 | 3/2012 | Washizu et al. |
| 8,167,126 B2 | 5/2012 | Stiehl |
| 8,169,402 B2 | 5/2012 | Shahoian et al. |
| 8,188,989 B2 | 5/2012 | Levin et al. |
| 8,195,313 B1 | 6/2012 | Fadell et al. |
| 8,229,535 B2 | 7/2012 | Mensinger et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,275,327 B2 | 9/2012 | Yi et al. |
| 8,294,670 B2 | 10/2012 | Griffin et al. |
| 8,312,495 B2 | 11/2012 | Vanderhoff |
| 8,318,340 B2 | 11/2012 | Stimits |
| 8,368,677 B2 | 2/2013 | Yamamoto |
| 8,371,745 B2 | 2/2013 | Manni |
| 8,373,661 B2 | 2/2013 | Lan et al. |
| 8,405,618 B2 | 3/2013 | Colgate |
| 8,410,971 B2 | 4/2013 | Friedlander |
| 8,432,368 B2 | 4/2013 | Momeyer et al. |
| 8,439,559 B2 | 5/2013 | Luk et al. |
| 8,441,450 B2 | 5/2013 | Degner et al. |
| 8,446,713 B2 | 5/2013 | Lai |
| 8,456,430 B2 | 6/2013 | Oliver et al. |
| 8,477,118 B2 | 7/2013 | Lan et al. |
| 8,493,190 B2 | 7/2013 | Periquet et al. |
| 8,508,511 B2 | 8/2013 | Tanaka et al. |
| 8,525,777 B2 | 9/2013 | Stavely et al. |
| 8,562,489 B2 | 10/2013 | Burton et al. |
| 8,568,313 B2 | 10/2013 | Sadhu |
| 8,576,044 B2 | 11/2013 | Chapman |
| 8,593,598 B2 | 11/2013 | Chen et al. |
| 8,607,662 B2 | 12/2013 | Huang |
| 8,614,881 B2 | 12/2013 | Yoo |
| 8,624,836 B1 | 1/2014 | Miller et al. |
| 8,666,682 B2 | 3/2014 | LaVigne et al. |
| 8,677,285 B2 | 3/2014 | Tsern et al. |
| 8,704,787 B2 | 4/2014 | Yamamoto |
| 8,711,093 B2 | 4/2014 | Ong et al. |
| 8,717,151 B2 | 5/2014 | Forutanpour et al. |
| 8,724,087 B2 | 5/2014 | Van De Kerkhof et al. |
| 8,730,167 B2 | 5/2014 | Ming et al. |
| 8,743,088 B2 | 6/2014 | Watanabe |
| 8,783,944 B2 | 7/2014 | Doi |
| 8,797,153 B2 | 8/2014 | Vanhelle et al. |
| 8,804,993 B2 | 8/2014 | Shukla et al. |
| 8,810,514 B2 | 8/2014 | Zhao et al. |
| 8,816,962 B2 | 8/2014 | Obermeyer et al. |
| 8,824,245 B2 | 9/2014 | Lau et al. |
| 8,847,741 B2 | 9/2014 | Birnbaum et al. |
| 8,851,372 B2 | 10/2014 | Zhou |
| 8,859,971 B2 | 10/2014 | Weber |
| 8,860,674 B2 | 10/2014 | Lee et al. |
| 8,863,219 B2 | 10/2014 | Brown et al. |
| D717,679 S | 11/2014 | Anderssen |
| 8,878,657 B2 | 11/2014 | Periquet et al. |
| 8,885,856 B2 | 11/2014 | Sacha |
| 8,895,911 B2 | 11/2014 | Takahashi |
| 8,905,631 B2 | 12/2014 | Sakurazawa et al. |
| 8,908,477 B2 | 12/2014 | Peters |
| 8,920,022 B2 | 12/2014 | Ishida et al. |
| 8,922,399 B2 | 12/2014 | Bajaj et al. |
| 8,928,452 B2 | 1/2015 | Kim et al. |
| 8,948,832 B2 | 2/2015 | Hong et al. |
| 8,954,135 B2 | 2/2015 | Yuen et al. |
| 8,975,543 B2 | 3/2015 | Hakemeyer |
| 8,994,827 B2 | 3/2015 | Mistry et al. |
| 9,001,625 B2 | 4/2015 | Essery et al. |
| 9,010,945 B2 | 4/2015 | Vasylyev |
| 9,024,733 B2 | 5/2015 | Wouters |
| 9,028,134 B2 | 5/2015 | Koshoji et al. |
| 9,030,446 B2 | 5/2015 | Mistry et al. |
| 9,034,666 B2 | 5/2015 | Vaganov et al. |
| 9,039,614 B2 | 5/2015 | Yuen et al. |
| 9,041,663 B2 | 5/2015 | Westerman |
| 9,042,971 B2 | 5/2015 | Brumback et al. |
| 9,049,998 B2 | 6/2015 | Brumback et al. |
| 9,052,696 B2 | 6/2015 | Breuillot et al. |
| 9,086,717 B2 | 7/2015 | Meerovitsch |
| 9,086,738 B2 | 7/2015 | Leung et al. |
| 9,091,309 B2 | 7/2015 | Battlogg |
| 9,100,493 B1 | 8/2015 | Zhou |
| 9,101,184 B2 | 8/2015 | Wilson |
| 9,105,413 B2 | 8/2015 | Hiranuma et al. |
| 9,123,483 B2 | 9/2015 | Ferri et al. |
| 9,134,807 B2 | 9/2015 | Shaw et al. |
| 9,141,087 B2 | 9/2015 | Brown et al. |
| 9,176,577 B2 | 11/2015 | Jangaard et al. |
| 9,176,598 B2 | 11/2015 | Sweetser et al. |
| 9,202,372 B2 | 12/2015 | Reams et al. |
| 9,213,409 B2 | 12/2015 | Redelsheimer et al. |
| 9,223,296 B2 | 12/2015 | Yang et al. |
| 9,241,635 B2 | 1/2016 | Yuen et al. |
| 9,244,438 B2 | 1/2016 | Hoover et al. |
| 9,256,209 B2 | 2/2016 | Yang et al. |
| 9,277,156 B2 | 3/2016 | Bennett et al. |
| 9,348,322 B2 | 5/2016 | Fraser et al. |
| 9,350,850 B2 | 5/2016 | Pope et al. |
| 9,367,146 B2 | 6/2016 | Piot |
| 9,386,932 B2 | 7/2016 | Chatterjee et al. |
| 9,426,275 B2 | 8/2016 | Eim et al. |
| 9,430,042 B2 | 8/2016 | Levin |
| 9,437,357 B2 | 9/2016 | Furuki et al. |
| 9,449,770 B2 | 9/2016 | Sanford et al. |
| 9,453,939 B2 | 9/2016 | Tortora et al. |
| 9,501,044 B2 | 11/2016 | Jackson et al. |
| 9,520,100 B2 | 12/2016 | Houjou et al. |
| 9,532,723 B2 | 1/2017 | Kim |
| 9,542,016 B2 | 1/2017 | Armstrong-Muntner |
| 9,545,541 B2 | 1/2017 | Aragones et al. |
| 9,547,280 B2 | 1/2017 | Born et al. |
| 9,552,023 B2 | 1/2017 | Joo et al. |
| 9,599,964 B2 | 3/2017 | Gracia |
| 9,600,071 B2 | 3/2017 | Rothkopf |
| 9,606,721 B2 | 3/2017 | Park et al. |
| 9,607,505 B2 | 3/2017 | Rothkopf et al. |
| 9,620,312 B2 | 4/2017 | Ely et al. |
| 9,627,163 B2 | 4/2017 | Ely |
| 9,632,318 B2 | 4/2017 | Goto et al. |
| 9,632,537 B2 | 4/2017 | Memering |
| 9,638,587 B2 | 5/2017 | Marquas et al. |
| 9,651,922 B2 | 5/2017 | Hysek et al. |
| 9,659,482 B2 | 5/2017 | Yang et al. |
| 9,680,831 B2 | 6/2017 | Jooste et al. |
| 9,709,956 B1 | 7/2017 | Ely et al. |

(56) References Cited

U.S. PATENT DOCUMENTS

| | | |
|---|---|---|
| 9,753,436 B2 | 9/2017 | Ely et al. |
| D800,172 S | 10/2017 | Akana |
| 9,800,717 B2 | 10/2017 | Ma et al. |
| 9,836,025 B2 | 12/2017 | Ely et al. |
| 9,851,613 B2 | 12/2017 | Noble et al. |
| 9,873,711 B2 | 1/2018 | Hoover et al. |
| 9,874,945 B2 | 1/2018 | Fukumoto |
| 9,886,006 B2 | 2/2018 | Ely et al. |
| 9,891,590 B2 | 2/2018 | Shim et al. |
| 9,891,651 B2 | 2/2018 | Jackson et al. |
| 9,891,667 B2 | 2/2018 | Jung et al. |
| 9,898,032 B2 | 2/2018 | Hafez et al. |
| 9,913,591 B2 | 3/2018 | Lapetina et al. |
| 9,921,548 B2 | 3/2018 | Mitani |
| 9,927,902 B2 | 3/2018 | Burr et al. |
| 9,939,923 B2 | 4/2018 | Sharma |
| 9,946,297 B2 | 4/2018 | Nazzaro et al. |
| 9,952,558 B2 | 4/2018 | Ely |
| 9,952,682 B2 | 4/2018 | Zhang et al. |
| 9,971,305 B2 | 5/2018 | Ely et al. |
| 9,971,405 B2 | 5/2018 | Salo et al. |
| 9,971,407 B2 | 5/2018 | Holenarsipur et al. |
| 9,979,426 B2 | 5/2018 | Na et al. |
| 10,001,817 B2 | 6/2018 | Zambetti et al. |
| 10,012,550 B2 | 7/2018 | Yang |
| 10,018,966 B2 | 7/2018 | Ely et al. |
| 10,019,097 B2 | 7/2018 | Ely et al. |
| 10,037,006 B2 | 7/2018 | Ely |
| 10,037,081 B2 | 7/2018 | Grant |
| 10,048,802 B2 | 8/2018 | Shedletsky |
| 10,057,470 B2 | 8/2018 | Kim et al. |
| 10,060,788 B2 | 8/2018 | Fei |
| 10,061,399 B2 | 8/2018 | Bushnell et al. |
| 10,066,970 B2 | 9/2018 | Gowreesunker et al. |
| 10,092,203 B2 | 10/2018 | Mirov |
| 10,108,016 B2 | 10/2018 | Bosveld |
| 10,114,342 B2 | 10/2018 | Kim et al. |
| 10,145,711 B2 | 12/2018 | Boonsom et al. |
| 10,175,652 B2 | 1/2019 | Ely et al. |
| 10,190,891 B1 | 1/2019 | Rothkopf et al. |
| 10,191,455 B2 | 1/2019 | Shim et al. |
| 10,203,662 B1 | 2/2019 | Lin et al. |
| 10,209,148 B2 | 2/2019 | Lyon et al. |
| 10,216,147 B2 | 2/2019 | Ely et al. |
| 10,222,755 B2 | 3/2019 | Coakley et al. |
| 10,222,756 B2 | 3/2019 | Ely et al. |
| 10,222,909 B2 | 3/2019 | Shedletsky et al. |
| 10,234,828 B2 | 3/2019 | Ely et al. |
| 10,241,593 B2 | 3/2019 | Chen |
| 10,296,125 B2 | 5/2019 | Ely et al. |
| 10,331,081 B2 | 6/2019 | Ely et al. |
| 10,331,082 B2 | 6/2019 | Ely et al. |
| 10,332,111 B2 | 6/2019 | Mokhasi et al. |
| 10,353,487 B2 | 7/2019 | Chung et al. |
| 10,379,629 B2 | 8/2019 | Bushnell et al. |
| 10,386,940 B2 | 8/2019 | Kim |
| 10,401,961 B2 | 9/2019 | Cruz-Hernandez et al. |
| 10,429,959 B2 | 10/2019 | Battlogg |
| 10,474,194 B1 | 11/2019 | Ell et al. |
| 10,503,258 B2 | 12/2019 | Holenarsipur et al. |
| 10,509,486 B2 | 12/2019 | Bushnell et al. |
| 10,524,671 B2 | 1/2020 | Lamego |
| 10,534,320 B2 | 1/2020 | Ferri |
| 10,551,798 B1 | 2/2020 | Bushnell et al. |
| 10,572,053 B2 | 2/2020 | Ely et al. |
| 10,593,617 B2 | 3/2020 | Ashikaga et al. |
| 10,599,101 B2 | 3/2020 | Rothkopf et al. |
| 10,610,157 B2 | 4/2020 | Pandya et al. |
| 10,613,685 B2 | 4/2020 | Shedletsky |
| 10,627,783 B2 | 4/2020 | Rothkopf et al. |
| 10,655,988 B2 | 5/2020 | Boonsom et al. |
| 10,664,074 B2 | 5/2020 | Moussette et al. |
| 10,732,571 B2 | 8/2020 | Ely et al. |
| 10,765,019 B2 | 9/2020 | Werner |
| 10,840,041 B1 | 11/2020 | Harms |
| 10,845,764 B2 | 11/2020 | Ely et al. |
| 10,852,700 B2 | 12/2020 | Abramov |
| 10,852,855 B2 | 12/2020 | Niu |
| 10,871,385 B2 | 12/2020 | Kok |
| 10,884,549 B2 | 1/2021 | Shedletsky et al. |
| 10,936,071 B2 | 3/2021 | Pandya et al. |
| 10,942,491 B2 | 3/2021 | Rothkopf |
| 10,948,880 B2 | 3/2021 | Ely et al. |
| 10,955,937 B2 | 3/2021 | Bushnell et al. |
| 10,962,930 B2 | 3/2021 | Ely et al. |
| 10,962,935 B1 | 3/2021 | Ely et al. |
| 10,987,054 B2 | 4/2021 | Pandya et al. |
| 11,000,193 B2 | 5/2021 | Tal et al. |
| 11,002,572 B2 | 5/2021 | Boonsom et al. |
| 11,029,831 B2 | 6/2021 | Block et al. |
| 11,036,318 B2 | 6/2021 | Kuboyama |
| 11,148,292 B2 | 10/2021 | Bryner et al. |
| 11,181,863 B2 | 11/2021 | Ely et al. |
| 11,194,099 B2 | 12/2021 | Taylor et al. |
| 11,194,298 B2 | 12/2021 | Roach et al. |
| 11,221,590 B2 | 1/2022 | Rothkopf et al. |
| 11,347,189 B1 | 5/2022 | Herrera et al. |
| 11,350,869 B2 | 6/2022 | Rasmussen et al. |
| 11,360,440 B2 * | 6/2022 | Perkins ................ G04C 3/008 |
| 11,385,599 B2 | 7/2022 | Ely et al. |
| 11,432,766 B2 | 9/2022 | Pandya et al. |
| 11,474,483 B2 | 10/2022 | Rothkopf et al. |
| 11,531,306 B2 | 12/2022 | Ely et al. |
| 11,556,095 B2 | 1/2023 | Hiemstra et al. |
| 11,567,457 B2 | 1/2023 | Rothkopf et al. |
| 11,644,800 B2 | 5/2023 | Holenarsipur et al. |
| 11,669,205 B2 | 6/2023 | Shedletsky et al. |
| 11,674,825 B2 | 6/2023 | Li et al. |
| 11,720,064 B2 | 8/2023 | Ely |
| 11,754,981 B2 * | 9/2023 | Perkins ................ G04C 3/008 368/69 |
| 11,796,961 B2 | 10/2023 | Ely et al. |
| 11,815,860 B2 | 11/2023 | Pandya et al. |
| 11,860,587 B2 | 1/2024 | Taylor et al. |
| 2002/0101457 A1 | 8/2002 | Lang |
| 2003/0174590 A1 | 9/2003 | Arikawa et al. |
| 2004/0047244 A1 | 3/2004 | Iino et al. |
| 2004/0082414 A1 | 4/2004 | Knox |
| 2004/0130971 A1 | 7/2004 | Ecoffet et al. |
| 2004/0264301 A1 | 12/2004 | Howard et al. |
| 2005/0075558 A1 | 4/2005 | Vecerina et al. |
| 2005/0088417 A1 | 4/2005 | Mulligan |
| 2006/0250377 A1 | 11/2006 | Zadesky et al. |
| 2007/0013775 A1 | 1/2007 | Shin |
| 2007/0050054 A1 | 3/2007 | Sambandam Guruparan et al. |
| 2007/0182708 A1 | 8/2007 | Poupyrev et al. |
| 2007/0211042 A1 | 9/2007 | Kim et al. |
| 2007/0222756 A1 | 9/2007 | Wu et al. |
| 2007/0229671 A1 | 10/2007 | Takeshita et al. |
| 2007/0242569 A1 | 10/2007 | Inoue |
| 2007/0247421 A1 | 10/2007 | Orsley et al. |
| 2008/0130914 A1 | 6/2008 | Cho |
| 2008/0181059 A1 | 7/2008 | Wai |
| 2008/0185272 A1 | 8/2008 | Otani et al. |
| 2009/0025872 A1 | 1/2009 | Nilsen et al. |
| 2009/0051649 A1 | 2/2009 | Rondel |
| 2009/0073119 A1 | 3/2009 | Le et al. |
| 2009/0115748 A1 | 5/2009 | Tanaka et al. |
| 2009/0122656 A1 | 5/2009 | Bonnet et al. |
| 2009/0146975 A1 | 6/2009 | Chang |
| 2009/0152452 A1 | 6/2009 | Lee et al. |
| 2009/0217207 A1 | 8/2009 | Kagermeier et al. |
| 2009/0285443 A1 | 11/2009 | Camp et al. |
| 2009/0312051 A1 | 12/2009 | Hansson et al. |
| 2010/0033430 A1 | 2/2010 | Kakutani et al. |
| 2010/0053468 A1 | 3/2010 | Havrill |
| 2010/0079225 A1 | 4/2010 | Washizu et al. |
| 2010/0081375 A1 | 4/2010 | Rosenblatt et al. |
| 2010/0149099 A1 | 6/2010 | Elias |
| 2011/0007468 A1 | 1/2011 | Burton et al. |
| 2011/0090148 A1 | 4/2011 | Li et al. |
| 2011/0158057 A1 | 6/2011 | Brewer et al. |
| 2011/0242064 A1 | 10/2011 | Ono et al. |
| 2011/0249378 A1 | 10/2011 | Yoo |

(56) References Cited

U.S. PATENT DOCUMENTS

| | | |
|---|---|---|
| 2011/0270358 A1 | 11/2011 | Davis et al. |
| 2012/0067711 A1 | 3/2012 | Yang |
| 2012/0068857 A1 | 3/2012 | Rothkopf et al. |
| 2012/0075082 A1 | 3/2012 | Rothkopf et al. |
| 2012/0112859 A1 | 5/2012 | Park et al. |
| 2012/0113044 A1 | 5/2012 | Strazisar et al. |
| 2012/0206248 A1 | 8/2012 | Biggs |
| 2012/0272784 A1 | 11/2012 | Bailey et al. |
| 2013/0037396 A1 | 2/2013 | Yu |
| 2013/0087443 A1 | 4/2013 | Kikuchi |
| 2013/0191220 A1 | 7/2013 | Dent et al. |
| 2013/0235704 A1 | 9/2013 | Grinberg |
| 2013/0261405 A1 | 10/2013 | Lee et al. |
| 2013/0335196 A1 | 12/2013 | Zhang et al. |
| 2014/0009397 A1 | 1/2014 | Gillespie |
| 2014/0045547 A1 | 2/2014 | Singamsetty et al. |
| 2014/0071098 A1 | 3/2014 | You |
| 2014/0073486 A1 | 3/2014 | Ahmed et al. |
| 2014/0132516 A1 | 5/2014 | Tsai et al. |
| 2014/0143784 A1 | 5/2014 | Mistry |
| 2014/0197936 A1 | 7/2014 | Biggs et al. |
| 2014/0340318 A1 | 11/2014 | Stringer et al. |
| 2014/0347289 A1 | 11/2014 | Suh et al. |
| 2014/0368442 A1 | 12/2014 | Vahtola |
| 2014/0375579 A1 | 12/2014 | Fujiwara |
| 2015/0041289 A1 | 2/2015 | Ely et al. |
| 2015/0049059 A1 | 2/2015 | Zadesky et al. |
| 2015/0098309 A1 | 4/2015 | Adams et al. |
| 2015/0124415 A1 | 5/2015 | Goyal et al. |
| 2015/0186609 A1 | 7/2015 | Utter, II |
| 2015/0221460 A1 | 8/2015 | Teplitxky et al. |
| 2015/0293592 A1 | 10/2015 | Cheong |
| 2015/0320346 A1 | 11/2015 | Chen |
| 2015/0338642 A1 | 11/2015 | Sanford |
| 2015/0341031 A1* | 11/2015 | Marquas ............... H01G 5/013 |
| | | 200/600 |
| 2015/0366098 A1 | 12/2015 | Lapetina et al. |
| 2016/0018846 A1 | 1/2016 | Zenoff |
| 2016/0054813 A1 | 2/2016 | Shediwy et al. |
| 2016/0058375 A1 | 3/2016 | Rothkopf et al. |
| 2016/0061636 A1 | 3/2016 | Gowreesunker et al. |
| 2016/0062623 A1 | 3/2016 | Howard et al. |
| 2016/0069713 A1 | 3/2016 | Ruh et al. |
| 2016/0098016 A1 | 4/2016 | Ely et al. |
| 2016/0109861 A1 | 4/2016 | Kim et al. |
| 2016/0116306 A1 | 4/2016 | Ferri et al. |
| 2016/0147432 A1 | 5/2016 | Shi et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0241688 A1 | 8/2016 | Vossoughi |
| 2016/0253487 A1 | 9/2016 | Sarkar et al. |
| 2016/0258784 A1* | 9/2016 | Boonsom ............ G01D 5/34715 |
| 2016/0306446 A1 | 10/2016 | Chung et al. |
| 2016/0320583 A1 | 11/2016 | Hall, Jr. |
| 2016/0327911 A1 | 11/2016 | Eim et al. |
| 2016/0338642 A1 | 11/2016 | Parara et al. |
| 2016/0378069 A1 | 12/2016 | Rothkopf et al. |
| 2016/0378070 A1 | 12/2016 | Rothkopf et al. |
| 2017/0010751 A1* | 1/2017 | Shedletsky ............ G06F 3/044 |
| 2017/0011210 A1 | 1/2017 | Cheong et al. |
| 2017/0027461 A1 | 2/2017 | Shin et al. |
| 2017/0031449 A1 | 2/2017 | Karsten et al. |
| 2017/0061863 A1 | 3/2017 | Eguchi |
| 2017/0069443 A1 | 3/2017 | Wang et al. |
| 2017/0069444 A1 | 3/2017 | Wang et al. |
| 2017/0069447 A1 | 3/2017 | Wang et al. |
| 2017/0089735 A1 | 3/2017 | Ruh |
| 2017/0090572 A1 | 3/2017 | Holenarsipur |
| 2017/0090599 A1 | 3/2017 | Kuboyama |
| 2017/0104902 A1 | 4/2017 | Kim et al. |
| 2017/0139489 A1 | 5/2017 | Chen et al. |
| 2017/0216519 A1 | 8/2017 | Vouillamoz |
| 2017/0216668 A1 | 8/2017 | Burton et al. |
| 2017/0238138 A1 | 8/2017 | Aminzade |
| 2017/0251561 A1 | 8/2017 | Fleck et al. |
| 2017/0269715 A1 | 9/2017 | Kim et al. |
| 2017/0285404 A1 | 10/2017 | Kubota et al. |
| 2017/0301314 A1 | 10/2017 | Kim et al. |
| 2017/0307414 A1 | 10/2017 | Ferri et al. |
| 2017/0331869 A1 | 11/2017 | Bendahan et al. |
| 2017/0357465 A1 | 12/2017 | Dzeryn et al. |
| 2018/0018026 A1 | 1/2018 | Bushnell et al. |
| 2018/0024683 A1* | 1/2018 | Ely .................... H03K 17/975 |
| | | 345/174 |
| 2018/0059624 A1 | 3/2018 | James |
| 2018/0136686 A1 | 5/2018 | Jackson et al. |
| 2018/0196517 A1 | 7/2018 | Tan et al. |
| 2018/0225701 A1 | 8/2018 | Han |
| 2018/0235491 A1 | 8/2018 | Bayley et al. |
| 2018/0337551 A1 | 11/2018 | Park |
| 2019/0025940 A1 | 1/2019 | Shim |
| 2019/0056700 A1 | 2/2019 | Matsuno |
| 2019/0072911 A1 | 3/2019 | Ely et al. |
| 2019/0072912 A1 | 3/2019 | Pandya et al. |
| 2019/0082547 A1 | 3/2019 | Werner et al. |
| 2019/0088583 A1 | 3/2019 | Ashikaga et al. |
| 2019/0278232 A1 | 9/2019 | Ely et al. |
| 2019/0317454 A1 | 10/2019 | Holenarsipur et al. |
| 2019/0391539 A1 | 12/2019 | Perkins et al. |
| 2020/0041962 A1 | 2/2020 | Beyhs |
| 2020/0064774 A1 | 2/2020 | Ely et al. |
| 2020/0064779 A1 | 2/2020 | Pandya et al. |
| 2020/0073339 A1 | 3/2020 | Roach et al. |
| 2020/0110473 A1 | 4/2020 | Bushnell et al. |
| 2020/0150815 A1 | 5/2020 | Ely et al. |
| 2020/0159172 A1 | 5/2020 | Bushnell et al. |
| 2020/0233380 A1 | 7/2020 | Rothkopf |
| 2020/0233529 A1 | 7/2020 | Shedletsky et al. |
| 2020/0310609 A1 | 10/2020 | Ham |
| 2021/0055696 A1 | 2/2021 | Ely |
| 2021/0060783 A1 | 3/2021 | Bryner et al. |
| 2021/0089136 A1 | 3/2021 | Hossain et al. |
| 2021/0096688 A1 | 4/2021 | Shedletsky et al. |
| 2021/0157278 A1 | 5/2021 | Xue |
| 2021/0181682 A1 | 6/2021 | Ely et al. |
| 2021/0181688 A1 | 6/2021 | Ely et al. |
| 2021/0181690 A1 | 6/2021 | Rothkopf et al. |
| 2021/0181691 A1 | 6/2021 | Rothkopf et al. |
| 2021/0181692 A1 | 6/2021 | Rothkopf et al. |
| 2021/0181865 A1 | 6/2021 | Bushnell et al. |
| 2021/0199475 A1 | 7/2021 | Danler et al. |
| 2021/0255590 A1 | 8/2021 | Ely et al. |
| 2021/0303081 A1 | 9/2021 | Kuboyama et al. |
| 2021/0353226 A1 | 11/2021 | Hiemstra |
| 2021/0373501 A1 | 12/2021 | Pandya et al. |
| 2021/0405594 A1 | 12/2021 | Holenarsipur et al. |
| 2022/0043397 A1 | 2/2022 | Ely et al. |
| 2022/0043402 A1 | 2/2022 | Roach et al. |
| 2022/0075328 A1 | 3/2022 | Taylor |
| 2022/0261111 A1 | 8/2022 | Shedletsky et al. |
| 2022/0299944 A1 | 9/2022 | Ely et al. |
| 2022/0326660 A1 | 10/2022 | Perkins et al. |
| 2022/0413446 A1 | 12/2022 | Rothkopf et al. |
| 2023/0012897 A1 | 1/2023 | Atura-Bushnell et al. |
| 2023/0013283 A1 | 1/2023 | Herrera et al. |
| 2023/0028554 A1 | 1/2023 | Rothkopf et al. |
| 2023/0077241 A1 | 3/2023 | Pandya et al. |
| 2023/0097827 A1 | 3/2023 | Rothkopf et al. |
| 2023/0101015 A1 | 3/2023 | Ely et al. |
| 2023/0161299 A1 | 5/2023 | Beyhs |
| 2023/0168635 A1 | 6/2023 | Hiemstra et al. |
| 2023/0213893 A1 | 7/2023 | Rothkopf et al. |
| 2023/0341819 A1 | 7/2023 | Ely et al. |
| 2023/0258479 A1 | 8/2023 | Li et al. |
| 2023/0259235 A1 | 8/2023 | Shedletsky et al. |
| 2023/0273572 A1 | 8/2023 | Holenarsipur et al. |
| 2023/0400818 A1 | 12/2023 | Davis et al. |
| 2023/0418230 A1 | 12/2023 | Ely et al. |
| 2024/0036523 A1 | 2/2024 | Pandya et al. |

(56) References Cited

U.S. PATENT DOCUMENTS

| | | |
|---|---|---|
| 2024/0045383 A1 | 2/2024 | Roach et al. |
| 2024/0053707 A1 | 2/2024 | Ely et al. |

FOREIGN PATENT DOCUMENTS

| | | |
|---|---|---|
| CN | 1302740 | 9/2001 |
| CN | 1445627 | 10/2003 |
| CN | 1504843 | 6/2004 |
| CN | 1601408 | 3/2005 |
| CN | 1624427 | 6/2005 |
| CN | 1792295 | 6/2006 |
| CN | 1825224 | 8/2006 |
| CN | 101035148 | 9/2007 |
| CN | 101201587 | 6/2008 |
| CN | 201081979 | 7/2008 |
| CN | 101404928 | 4/2009 |
| CN | 201262741 | 6/2009 |
| CN | 101641663 | 2/2010 |
| CN | 101750958 | 6/2010 |
| CN | 201638168 | 11/2010 |
| CN | 101923314 | 12/2010 |
| CN | 102067070 | 5/2011 |
| CN | 102216959 | 10/2011 |
| CN | 202008579 | 10/2011 |
| CN | 102590925 | 7/2012 |
| CN | 102741772 | 10/2012 |
| CN | 102890443 | 1/2013 |
| CN | 202710937 | 1/2013 |
| CN | 103177891 | 6/2013 |
| CN | 103191557 | 7/2013 |
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103919536 | 7/2014 |
| CN | 103956006 | 7/2014 |
| CN | 203693601 | 7/2014 |
| CN | 203705837 | 7/2014 |
| CN | 203732900 | 7/2014 |
| CN | 103995456 | 8/2014 |
| CN | 104020660 | 9/2014 |
| CN | 203941395 | 11/2014 |
| CN | 104777987 | 4/2015 |
| CN | 104685794 | 6/2015 |
| CN | 204479929 | 7/2015 |
| CN | 204496177 | 7/2015 |
| CN | 104880937 | 9/2015 |
| CN | 104898406 | 9/2015 |
| CN | 204650147 | 9/2015 |
| CN | 105022947 | 11/2015 |
| CN | 105096979 | 11/2015 |
| CN | 105339871 | 2/2016 |
| CN | 105446125 | 3/2016 |
| CN | 205121417 | 3/2016 |
| CN | 105547146 | 5/2016 |
| CN | 105556433 | 5/2016 |
| CN | 105683876 | 6/2016 |
| CN | 105683877 | 6/2016 |
| CN | 105760067 | 7/2016 |
| CN | 105955519 | 9/2016 |
| CN | 205645648 | 10/2016 |
| CN | 205721636 | 11/2016 |
| CN | 205750744 | 11/2016 |
| CN | 106236051 | 12/2016 |
| CN | 106557218 | 4/2017 |
| CN | 206147524 | 5/2017 |
| CN | 206209589 | 5/2017 |
| CN | 107111342 | 8/2017 |
| CN | 107122088 | 9/2017 |
| CN | 107966895 | 4/2018 |
| CN | 209560397 | 10/2019 |
| CN | 209625187 | 11/2019 |
| CN | 114220694 | 3/2022 |
| CN | 106125968 | 11/2022 |
| DE | 2352016 | 4/1975 |
| DE | 3706194 | 9/1988 |
| DE | 102008023651 | 11/2009 |
| DE | 102016215087 | 3/2017 |
| EP | 0165548 | 12/1985 |
| EP | 0556155 | 8/1993 |
| EP | 1345095 | 9/2003 |
| EP | 1519452 | 3/2005 |
| EP | 1669724 | 6/2006 |
| EP | 1832969 | 9/2007 |
| EP | 2375295 | 10/2011 |
| EP | 2579186 | 4/2013 |
| EP | 2720129 | 4/2014 |
| EP | 2884239 | 6/2015 |
| FR | 2030093 | 10/1970 |
| FR | 2801402 | 5/2001 |
| GB | 887369 | 1/1962 |
| GB | 2433211 | 6/2007 |
| JP | S52151058 | 12/1977 |
| JP | S52164551 | 12/1977 |
| JP | S53093067 | 8/1978 |
| JP | S5478178 | 6/1979 |
| JP | S54087779 | 6/1979 |
| JP | S5708582 | 1/1982 |
| JP | S5734457 | 2/1982 |
| JP | S60103936 | 6/1985 |
| JP | S60103937 | 6/1985 |
| JP | H02285214 | 11/1990 |
| JP | H04093719 | 3/1992 |
| JP | H04157319 | 5/1992 |
| JP | H05203465 | 8/1993 |
| JP | H05312595 | 11/1993 |
| JP | H06050927 | 12/1994 |
| JP | H06331761 | 12/1994 |
| JP | H06347293 | 12/1994 |
| JP | H07116141 | 5/1995 |
| JP | H0914941 | 1/1997 |
| JP | H10161811 | 6/1998 |
| JP | H11121210 | 4/1999 |
| JP | H11191508 | 7/1999 |
| JP | 2000258559 | 9/2000 |
| JP | 2000316824 | 11/2000 |
| JP | 2000337892 | 12/2000 |
| JP | 2001084934 | 3/2001 |
| JP | 2001167651 | 6/2001 |
| JP | 2001202178 | 7/2001 |
| JP | 2001215288 | 8/2001 |
| JP | 2001289977 | 10/2001 |
| JP | 2001524206 | 11/2001 |
| JP | 2002071480 | 3/2002 |
| JP | 2002165768 | 6/2002 |
| JP | 2003036144 | 2/2003 |
| JP | 2003050668 | 2/2003 |
| JP | 2003151410 | 5/2003 |
| JP | 2003215271 | 7/2003 |
| JP | 2003331693 | 11/2003 |
| JP | 2004079410 | 3/2004 |
| JP | 2004184396 | 7/2004 |
| JP | 2004028979 | 11/2004 |
| JP | 2005017011 | 1/2005 |
| JP | 2005063200 | 3/2005 |
| JP | 2005099023 | 4/2005 |
| JP | 2005108630 | 4/2005 |
| JP | 2006101505 | 4/2006 |
| JP | 2006164275 | 6/2006 |
| JP | 3852854 | 12/2006 |
| JP | 2007101380 | 4/2007 |
| JP | 2007149620 | 6/2007 |
| JP | 2007248176 | 9/2007 |
| JP | 2007285748 | 11/2007 |
| JP | 2007311153 | 11/2007 |
| JP | 2008053980 | 3/2008 |
| JP | 2008122124 | 5/2008 |
| JP | 2008122377 | 5/2008 |
| JP | 2008170436 | 7/2008 |
| JP | 2008235226 | 10/2008 |
| JP | 2009009382 | 1/2009 |
| JP | 2009070657 | 4/2009 |
| JP | 2009519737 | 5/2009 |

(56) References Cited

FOREIGN PATENT DOCUMENTS

| | | |
|---|---|---|
| JP | 2009540399 | 11/2009 |
| JP | 2010032545 | 2/2010 |
| JP | 2010515153 | 5/2010 |
| JP | 2010165001 | 7/2010 |
| JP | 2010186572 | 8/2010 |
| JP | 2010243344 | 10/2010 |
| JP | 2010244797 | 10/2010 |
| JP | 2011021929 | 2/2011 |
| JP | 2011165468 | 8/2011 |
| JP | 2011221659 | 11/2011 |
| JP | 2012053801 | 3/2012 |
| JP | 2012221905 | 11/2012 |
| JP | 2013057516 | 3/2013 |
| JP | 2013079961 | 5/2013 |
| JP | 2013524189 | 6/2013 |
| JP | 3190075 | 4/2014 |
| JP | 5477393 | 4/2014 |
| JP | 2014512556 | 5/2014 |
| JP | 2014112222 | 6/2014 |
| JP | 2014174031 | 9/2014 |
| JP | 2017219448 | 12/2017 |
| JP | 2018510451 | 4/2018 |
| KR | 20010030477 | 4/2001 |
| KR | 200278568 | 3/2002 |
| KR | 20070011685 | 1/2007 |
| KR | 20070014247 | 2/2007 |
| KR | 100754674 | 9/2007 |
| KR | 20080028935 | 4/2008 |
| KR | 20080045397 | 5/2008 |
| KR | 100849684 | 8/2008 |
| KR | 1020080111563 | 12/2008 |
| KR | 2020100007563 | 7/2010 |
| KR | 20110011393 | 2/2011 |
| KR | 20110012784 | 2/2011 |
| KR | 20110103761 | 9/2011 |
| KR | 20110113368 | 10/2011 |
| KR | 20130036038 | 4/2013 |
| KR | 20130131873 | 12/2013 |
| KR | 20140051391 | 4/2014 |
| KR | 20140064689 | 5/2014 |
| KR | 20140104388 | 8/2014 |
| KR | 20160017070 | 2/2016 |
| KR | 20160048967 | 5/2016 |
| KR | 20170106395 | 9/2017 |
| KR | 10-2020-0027010 | 3/2020 |
| KR | 102136836 | 7/2020 |
| NL | 1040225 | 11/2014 |
| RO | 129033 | 11/2013 |
| TW | 200633681 | 10/2006 |
| WO | WO2001/022038 | 3/2001 |
| WO | WO2001/069567 | 9/2001 |
| WO | WO2003/032538 | 4/2003 |
| WO | WO 10/001299 | 1/2010 |
| WO | WO2010/058376 | 5/2010 |
| WO | WO2012/083380 | 6/2012 |
| WO | WO2012/094805 | 7/2012 |
| WO | WO2014/018118 | 1/2014 |
| WO | WO2014/200766 | 12/2014 |
| WO | WO 15/034149 | 3/2015 |
| WO | WO 15/116111 | 8/2015 |
| WO | WO 15/122885 | 8/2015 |
| WO | WO2015/147756 | 10/2015 |
| WO | WO2016080669 | 5/2016 |
| WO | WO2016/104922 | 6/2016 |
| WO | WO2016155761 | 10/2016 |
| WO | WO 16/208835 | 12/2016 |
| WO | WO2016196171 | 12/2016 |
| WO | WO2016208835 | 12/2016 |
| WO | WO2017013278 | 1/2017 |
| WO | WO 18/236553 | 12/2018 |
| WO | WO2020173085 | 9/2020 |

OTHER PUBLICATIONS

Author Unknown, "Fossil Q ups smartwatch game with handsome design and build," Business Mirror, Makati City, Philippines, 3 pages, Dec. 20, 2016.

Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.

Author Unknown, "mHealth," http://mhealth.vesag.com/?m=201012, 7 pages, Dec. 23, 2010.

Author Unknown, "mHealth Summit 2010," http://www.virtualpressoffice.com/eventsSubmenu.do?page=exhibitorPage&showId=1551&companyId=5394, 5 pages, Nov. 18, 2010.

Author Unknown, "MyKronoz ZeTime: World's Most Funded Hybrid Smartwatch Raised over $3M on Kickstarter, Running until April 27," Business Wire, New York, New York, 3 pages, Apr. 21, 2017.

Author Unknown, "RedEye mini Plug-in Universal Remote Adapter for iPhone, iPod touch and iPad," Amazon.com, 4 pages, date unknown.

Author Unknown, "Re iPhone Universal Remote Control—Infrared Remote Control Accessory for iphone and ipod touch," http://www.amazon.com/iPhone-Universal-Remote-Control-Accessory/dp/tech-data/B0038Z4 . . . , 2 pages, at least as early as Jul. 15, 2010.

Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.

Author Unknown, "Vyzin Electronics Private Limited launches Vesag Watch," http://www.virtualpressoffice.com/showJointPage.do?page=jp&showId=1544, 5 pages, Jan. 6, 2011.

Author Unknown, "Vyzin Unveiled Personal Emergency Response System (PERS) with Remote Health Monitoring That Can Be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.

Author Unknown, "DeskThorityNet, Optical Switch Keyboards," http://deskthority.net/keyboards-f2/optical-switch-keyboards-t1474.html, 22 pages, Jul. 11, 2015.

Epstein et al., "Economical, High-Performance Optical Encoders," Hewlett-Packard Journal, pp. 99-106, Oct. 1988. [text only version].

GreyB, "Google Watch: Convert your arm into a keyboard," http://www.whatafuture.com/2014/02/28/google-smartwatch/#sthash.Yk35cDXK.dpbs, 3 pages, Feb. 28, 2014.

IBM, "Additional Functionality Added to Cell Phone via "Learning" Function Button," www.ip.com, 2 pages, Feb. 21, 2007.

Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.

Krishnan et al., "A Miniature Surface Mount Reflective Optical Shaft Encoder," Hewlett-Packard Journal, Article 8, pp. 1-6, Dec. 1996.

Narayanaswami et al., "Challenges and considerations for the design and production of a purpose-optimized body-worn wristwatch computer," Defense, Security, and Cockpit Displays, 2004.

M.T. Raghunath et al., User Interfaces for Applications on a Wrist Watch, Personal and Ubiquitous Computing, vol. 6, No. 1, 2002, Springer.

Rick, "How VESAG Helps Health Conscious Citizens," http://sensetekgroup.com/2010/11/29/wireless-health-monitoring-system/, 2 pages, Nov. 29, 2010.

Sadhu, Rajendra, "How VESAG Helps People Who Want to 'Be There'?," http://ezinearticles.com/?How-Vesag-Helps-People-Who-Want-to-Be-There?&id-5423873, 1 page, Nov. 22, 2010.

Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.

Sherr, Sol, "Input Devices," p. 55, Mar. 1988.

(56) References Cited

OTHER PUBLICATIONS

Tran et al., "Universal Programmable Remote Control/Telephone," www.ip.com, 2 pages, May 1, 1992.

* cited by examiner

CROWN FOR AN ELECTRONIC WATCH

CROSS-REFERENCE TO RELATED APPLICATIONS

This application is a continuation application of U.S. patent application Ser. No. 17/838,247, titled "Crown for an Electronic Watch," filed Jun. 12, 2022, which is a continuation of U.S. patent application Ser. No. 16/408,774, titled "Crown for an Electronic Watch," filed May 10, 2019, and issued as U.S. Pat. No. 11,360,440 on Jun. 14, 2022, which is a non-provisional patent application of and claims the benefit of U.S. Provisional Patent Application No. 62/689,775, titled "Crown for an Electronic Watch," filed Jun. 25, 2018, the disclosure of which are hereby all incorporated herein by reference in their entirety.

FIELD

The described embodiments relate generally to electronic devices, and more particularly to a crown for a wearable electronic device.

BACKGROUND

Electronic devices frequently use physical input devices to facilitate user interaction. For example, buttons, keys, dials, and the like, can be physically manipulated by users to control operations of the device. Physical input devices may use various types of sensing mechanisms to translate the physical manipulation to signals usable by the electronic device. For example, buttons and keys may use collapsible dome switches to detect presses, while dials and other rotating input devices may use encoders or resolvers to detect rotational movements.

SUMMARY

An electronic watch includes a housing, a display positioned at least partially within the housing, a cover covering at least part of the display, and a crown having a portion positioned along a side of the housing. The crown may include an inner member that is rotationally constrained relative to the housing and an outer member that is rotationally free relative to the inner member. The device may further include a rotation sensor configured to sense a rotation of the outer member relative to the inner member. The housing may define an interior volume, the inner member may define an exterior portion, the exterior portion of the inner member may define a circular peripheral surface, the outer member may be coupled to the exterior portion of the inner member and configured to rotate along the circular peripheral surface, and the outer member is positioned outside the interior volume such that the rotation of the outer member occurs outside the interior volume. The rotation sensor may be at least partially within the inner member of the crown.

The housing may define an interior volume and an opening extending from the interior volume to an exterior environment of the housing. The rotation sensor may be configured to sense the rotation of the outer member via the opening. The rotation sensor may be an optical sensor, the electronic watch may further include an optically transmissive window covering at least part of the opening, and the rotation sensor may sense the rotation of the outer member through the optically transmissive window.

The electronic watch may further include a force sensing component positioned at least partially within the housing and configured to detect an axial force applied to the crown. The force sensing component may include a dome switch. The rotation sensor may be a Hall effect sensor. The rotation sensor may include a light detector and a light emitter configured to emit light toward the outer member of the crown. The light detector may detect the light after the light is reflected by the outer member of the crown.

A wearable electronic device may include a housing, a display positioned at least partially within the housing, a cover covering at least part of the display and defining a front face of the wearable electronic device, a crown positioned along a side of the housing and rotationally constrained relative to the housing, and a sensor configured to sense a movement of a finger as the finger is sliding along a surface of the crown. The crown may be rotationally fixed. A sensing element of the sensor may be positioned at least partially within the crown.

The crown may define a first portion of a surface, and the crown may include a protective cover covering the sensing element and defining a second portion of the surface. The sensing element may be an optical sensing element, and the protective cover is an optically transmissive window.

The display may define an output region. The cover may define an input surface that covers the output region and the sensor may be a touch sensor that extends along the output region and is configured to detect touch inputs applied to the input surface and to sense the movement of the finger sliding along the surface of the crown.

The housing may define an interior volume and an opening extending from the interior volume to an exterior of the housing, and the sensor may be configured to sense the movement of the finger through the opening.

A wearable electronic device may include a housing defining a side surface of the electronic device, a transparent cover coupled to the housing and defining a front surface of the wearable electronic device, a crown extending from the side surface and rotationally constrained relative to the housing, and a sensor configured to sense a movement of a finger sliding along a surface of the crown.

A wearable electronic device may include a housing, a display positioned at least partially within the housing, a cover covering at least part of the display and defining a front face of the wearable electronic device, and a crown positioned along a side of the housing. The crown may include an inner member that is rotationally constrained relative to the housing and an outer member that is rotationally free relative to the inner member. The wearable electronic device may further include a sensor configured to sense movement of a finger while the finger is rotating the outer member. The inner member may define a cylindrical surface, and the outer member may be a sleeve positioned around the cylindrical surface. The sensor may be positioned along a side of the housing.

The wearable electronic device may further include an actuator coupled to the crown and configured to produce a tactile output through the crown. The wearable electronic device may further include a force sensor configured to detect an axial force applied to the crown. The force sensor may determine a magnitude of the axial force and the wearable electronic device may cause the actuator to produce the tactile output if the magnitude of the axial force is greater than a threshold value.

A wearable electronic device may include a housing, a crown extending from a side of the housing and comprising a rotationally fixed first member and a rotationally free second member coupled to the rotationally fixed first member, and a sensor positioned on the housing and configured to sense movement of a finger while the finger is rotating the rotationally free second member of the crown.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
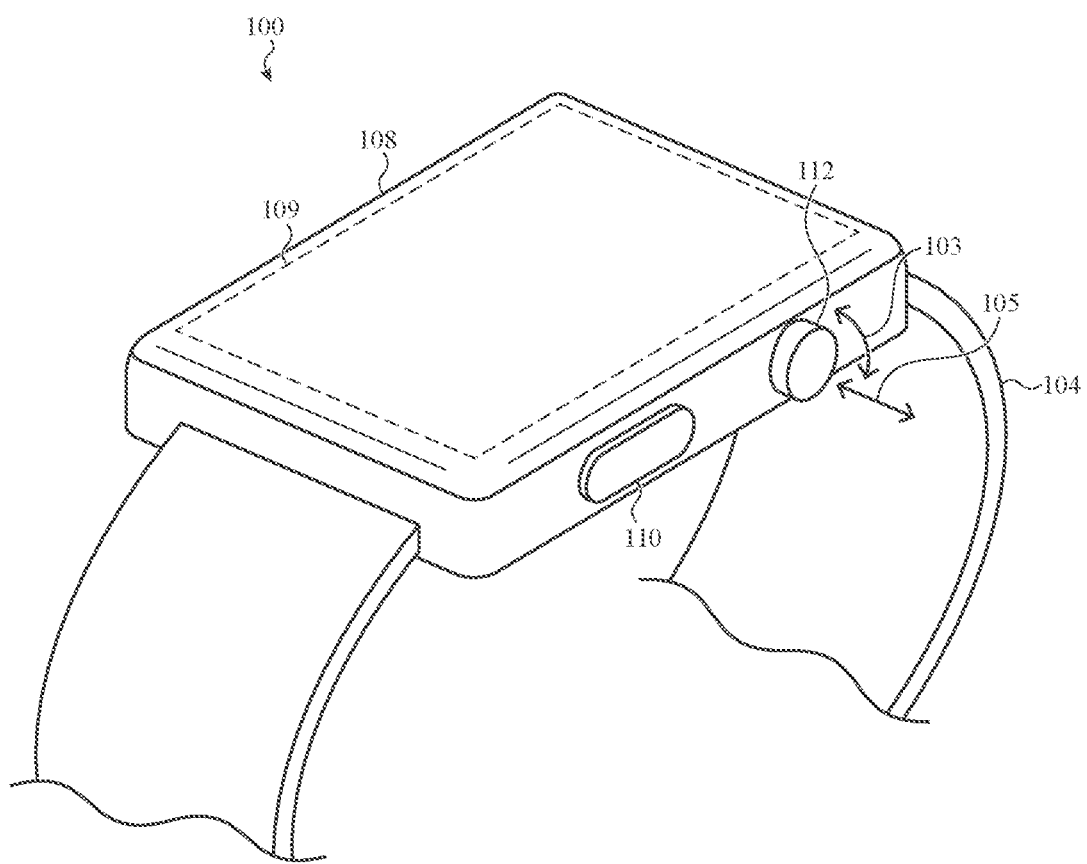
FIGS. 1A-1B depict a wearable electronic device.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to a crown of a wearable electronic device, such as a smart watch, and more particularly to a crown that includes a non-rotating (or rotationally constrained) component, yet is still able to detect when a user is interacting with the crown in a conventional manner. For example, a crown of a smart watch may be rotationally fixed relative to a housing such that, if a user attempts to rotate the crown to operate the device, the crown does not physically rotate. Instead, the user's fingers may slide along a surface of the crown while the crown remains stationary. The device may detect the movement of the user's fingers as they slide over the surface of the crown rather than sensing rotation of the crown. As used herein, a finger or object "sliding" along a surface may refer to the finger (or other object) moving along the surface while the finger (or other object) is in contact with the surface.

Using a rotationally fixed crown instead of a freely rotating crown may result in more robust and reliable devices. For example, a freely rotatable crown may include a shaft that extends through an opening in a housing so that the rotation of the shaft can be detected by an internal sensor, or so that the shaft can drive an internal gear train. However, the bearings, bushings, and other mechanisms that allow the shaft to rotate freely with respect to the housing of the device may allow water, sweat, lotion, sunscreen, dust, dirt, and other contaminants to clog the mechanism or to enter into the housing, potentially damaging the device. Further, rotating components may wear out over time, requiring repair or replacement or otherwise reducing the usability of the device. By eliminating the rotating shaft, a more robust and reliable crown may be provided. However, because the user can still interact with a rotationally fixed crown in a similar way to a conventional rotating crown (e.g., by attempting to rotate the crown with a finger), the rotationally fixed crown may still provide a familiar and intuitive input mechanism with which a user can control the device.

Many of the same benefits may be realized with crowns that include some rotatable components. For example, a crown may be configured with a rotationally fixed member and a rotationally free member, where the rotationally free member does not extend into the housing of the device. For example, the rotationally free member may be a sleeve that is free to rotate around a portion of a rotationally fixed shaft. A sensor may detect the rotation of the sleeve, while the rotationally fixed shaft (which may extend into the housing) does not rotate, and thus the crown can be more effectively sealed against liquids and contaminants. In some cases, even crowns with freely rotatable shafts may experience similar benefits by limiting or reducing the distance that the freely rotatable shaft translates when pushed. Examples of crowns having these, and other configurations are described in more detail herein.

As described above, the crown may be rotationally fixed and still allow the detection of rotational-style inputs on the crown (e.g., gestures that would produce a rotation on a conventional rotatable crown). However, in some cases, instead of being rotationally fixed, the crown (or a member or component of a crown) may be partially rotatable. More particularly, a partially rotatable crown may allow limited rotational motion while still being largely rotationally constrained. For example, a partially rotatable crown may allow a small amount of rotation (e.g., less than one degree, one degree, five degrees, ten degrees, etc.), after which the crown is prevented from rotating further. This relatively small amount of free rotation may facilitate several functions, such as allowing the crown to sense an amount of force or torque being applied to the crown, or to allow the crown to move to provide haptic outputs to a user. As used herein, a "rotationally constrained" component refers to a component that is not free to rotate more than a full revolution under normal use conditions (e.g., when manipulated by the hands of a person). Thus, rotationally constrained components include both rotationally fixed components and partially rotatable components.

Figure 1B:
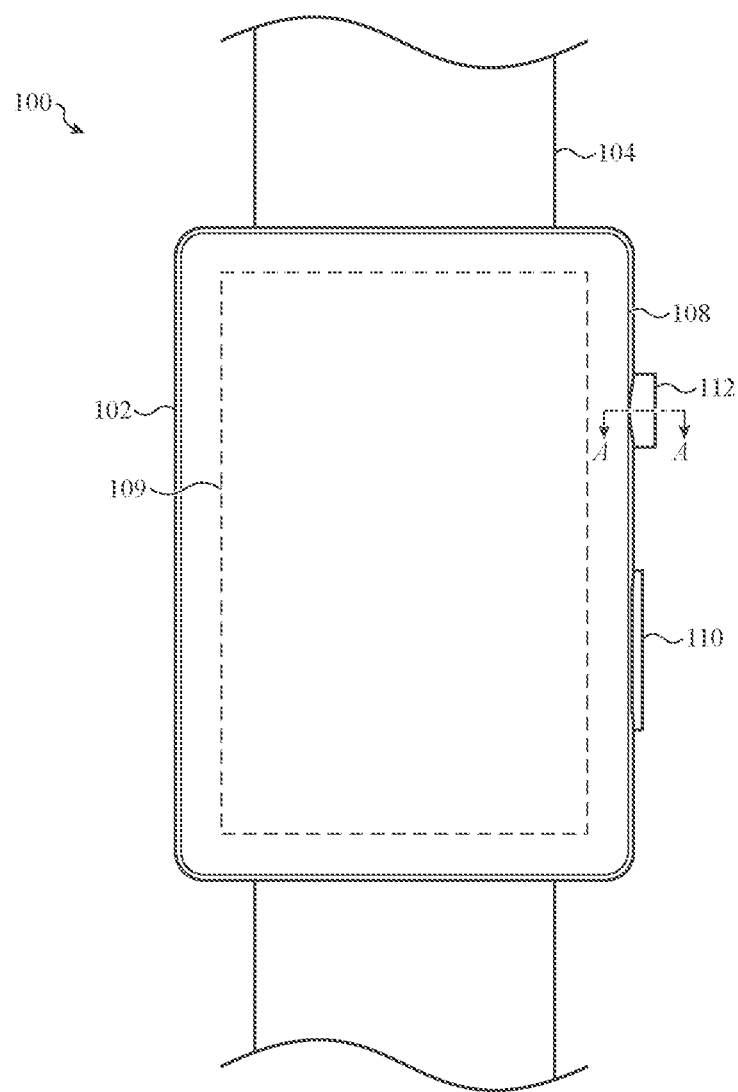

FIGS. 1A-1B depict an electronic device 100. The electronic device 100 is depicted as a watch (e.g., an electronic watch), though this is merely one example embodiment of an electronic device and the concepts discussed herein may apply equally or by analogy to other electronic devices, including mobile phones (e.g., smartphones), tablet computers, notebook computers, head-mounted displays, digital media players (e.g., mp3 players), or the like.

The electronic device 100 includes a housing 102 and a band 104 coupled to the housing. The band 104 may be configured to attach the electronic device 100 to a user, such as to the user's arm or wrist.

The electronic device 100 also includes a transparent cover 108 coupled to the housing 102. The cover 108 may define a front face of the electronic device 100. For example, in some cases, the cover 108 defines substantially the entire front face and/or front surface of the electronic device. The cover 108 may also define an input surface of the device 100. For example, as described herein, the device 100 may include touch and/or force sensors that detect inputs applied to the cover 108. The cover may be formed from or include glass, sapphire, a polymer, a dielectric, or any other suitable material.

The cover 108 may overlie at least part of a display 109 that is positioned at least partially within the housing 102. The display 109 may define an output region in which graphical outputs are displayed. Graphical outputs may include graphical user interfaces, user interface elements (e.g., buttons, sliders, etc.), text, lists, photographs, videos, or the like. The display 109 may include a liquid crystal display (LCD), organic light emitting diode display (OLED), or any other suitable components or display technology.

The display 109 may include or be associated with touch sensors and/or force sensors that extend along the output region of the display and that may use any suitable sensing elements and/or sensing techniques. Using touch sensors, the device 100 may detect touch inputs applied to the cover 108, including detecting locations of touch inputs, motions of touch inputs (e.g., the speed, direction, or other parameters of a gesture applied to the cover 108), or the like. Using force sensors, the device 100 may detect amounts or magnitudes of force associated with touch events applied to the cover 108. The touch and/or force sensors may detect various types of user inputs to control or modify the operation of the device, including taps, swipes, multi-finger inputs, single- or multi-finger touch gestures, presses, and the like. Further, as described herein, the touch and/or force sensors may detect motion of an object (e.g., a user's finger) as it is interacting with a crown 112 of the electronic device 100. Touch and/or force sensors usable with wearable electronic devices, such as the device 100, are described herein with respect to FIG. 12.

The electronic device 100 also includes a crown 112 having a knob, protruding portion, or component(s) or feature(s) positioned along a side of the housing 102. At least a portion of the crown 112 may protrude from the housing 102, and may define a generally circular shape or a circular exterior surface. The exterior surface of the crown 112 may be textured, knurled, grooved, or may otherwise have features that may improve the tactile feel of the crown 112 and/or facilitate rotation sensing.

The crown 112 may afford a variety of potential user interactions. For example, the crown 112 may include a rotationally free member that is free to rotate relative to a rotationally fixed member of the crown 112. More particularly, the rotationally free member may have no rotational constraints, and thus may be capable of being rotated indefinitely. In such cases, the device may include sensors that detect the rotation of the rotationally free member. Rotation sensors may be integrated with the crown 112 itself, or they may be integrated with the housing 102, the cover 108, the display 109, or another component of the device 100.

In some cases, the crown 112 may be rotationally constrained (e.g., rotationally fixed or partially rotatable), and may include or be associated with sensors that detect when a user slides one or more fingers along a surface of the crown 112 in a movement that resembles rotating the crown 112 (or that would result in rotation of a freely rotating crown). More particularly, where the crown 112 is rotationally fixed or rotationally constrained, a user input that resembles a twisting or rotating motion may not actually result in any substantial physical rotation that can be detected for the purposes of registering an input. Rather, the user's fingers (or other object) will result in a movement that resembles twisting, turning, or rotating, but does not actually continuously rotate the crown 112. Thus, in the case of a rotationally fixed or constrained crown 112, sensors may detect gestures that result from the application of an input that has the same motion as (and thus may feel and look the same as or similar to) rotating a rotatable crown. The sensors that detect such gestures may be on or near the crown 112.

Figure 2A:
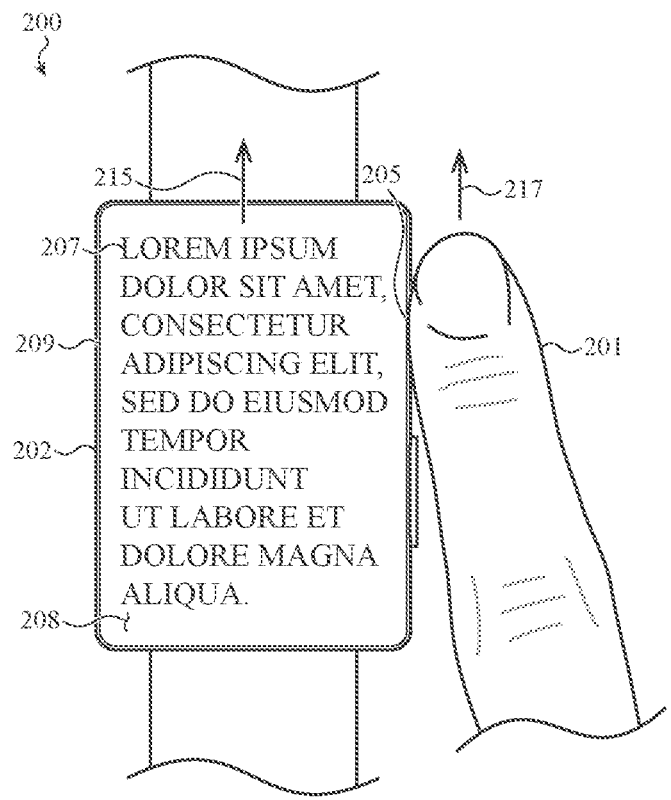
FIGS. 2A-2B depict another wearable electronic device being used.
Figure 2B:
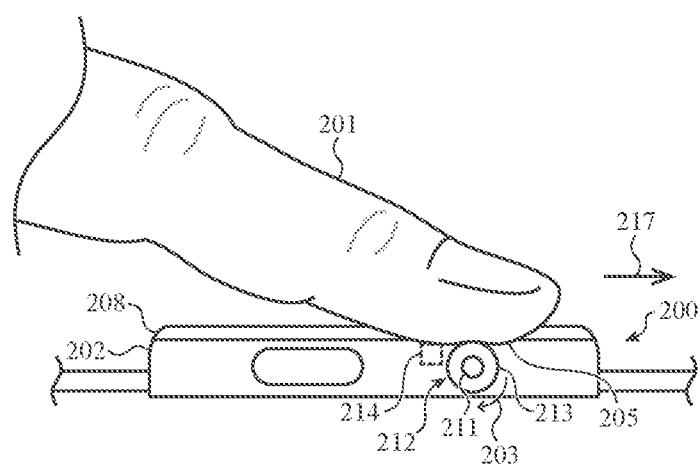

The particular gestures that are detected may depend at least in part on the types and/or locations of sensors in the device 100. For example, a user attempting to rotate a rotationally fixed crown 112 by pinching and twisting may result in a sliding gesture along the surface of the crown 112, and an optical sensor may sense the movement of the user's finger(s) along the surface. As another example, a user attempting to rotate a rotationally fixed crown by applying a substantially tangential force to a surface of the crown 112 (as shown in FIGS. 2A-2B, for example) may also result in a sliding gesture along a surface of the crown 112. The user's finger may also be in contact with a surface of the housing 102 and/or the cover 108 during these gestures, and as such the user's finger may slide along a surface of the housing 102 and/or the cover 108 in addition to a surface of the crown 112. As described herein, this may allow the device to detect the motion of the finger from various locations or positions on the device 100.

In cases where the crown 112, or a member or component of the crown 112, is capable of some rotation, it may rotate about a rotation axis (e.g., it may rotate as indicated by arrow 103 in FIG. 1A). The crown 112, or a member or component of the crown 112, may also be translatable relative to the housing 102 to accept axial inputs. For example, the crown 112 may be movable or translatable along the rotation axis, towards and/or away from the housing 102, as indicated by arrow 105 in FIG. 1A. The crown 112 may therefore be manipulated by pushing and/or pulling on the crown 112.

The crown 112 may be able to translate any suitable distance. For example, a crown 112 may include a dome switch to register axial inputs, and the crown 112 may move a sufficient distance to facilitate physical actuation of the dome switch. In other cases, such as where a force sensor is used to detect axial inputs, the crown 112 may move a sufficient distance to facilitate force sensing. The distance that the crown 112 can translate or move may be any suitable distance, such as about 1 mm, 0.5 mm, 0.2 mm, 0.1 mm, 0.05 mm or any other suitable distance.

The device 100 may include a force sensor to detect axial forces that are applied to the crown 112. The force sensor may include or use any suitable force sensing components and may use any suitable technique for sensing force inputs. For example, a force sensor may include a strain sensor, capacitive gap sensor, or other force sensitive structure that is configured to produce an electrical response that corresponds to an amount of force (e.g., axial force) applied to the crown 112. The electrical response may increase continuously as the amount of applied force increases, and as such may provide non-binary force sensing. Accordingly, the force sensor may determine, based on the electrical response of the force sensing components, one or more properties of the applied force associated with a touch input (e.g., a magnitude of the applied axial force).

As described herein, rotational inputs, gesture inputs (e.g., rotational-style inputs applied to a rotationally fixed crown), and axial inputs (e.g., translations or axial forces) may control various operations and user interfaces of the electronic device 100. In particular, inputs to the crown 112 may modify the graphical output of the display 109. For example, a rotational movement of the crown 112 or a gesture applied to the crown 112 may zoom, scroll, or rotate a user interface or other object displayed on the display 109 (among other possible functions), while translational movements or axial inputs may select highlighted objects or icons, or activate or deactivate functions (among other possible functions).

The crown 112 may also be associated with or include a contact sensor that is configured to detect contact between a user and the crown 112 (e.g., touch inputs or touch events applied to the crown 112). The contact sensor may detect even non-moving contacts between the user and the crown 112 (e.g., when the user touches the crown 112 but does not rotate the crown or apply a sliding gesture to the crown 112). Contact sensing functionality may be provided by a touch sensor that also detects gestures (e.g., a finger sliding along a surface of a crown or the housing), or it may be provided by a separate sensor. The contact sensor may include or use any suitable type of sensor(s), including capacitive sensors, resistive sensors, magnetic sensors, inductive sensors, or the like. In some cases, the crown 112 itself, or components of the crown, may be conductive and may define a conductive path between the user (e.g., the user's finger) and a contact sensor. For example, the crown may be formed from or include metal, and may itself act as an electrode for conductively coupling a capacitive sensor to the user.

The device 100 may also include one or more haptic actuators that are configured to produce a tactile output through the crown 112. For example, the haptic actuator may be coupled to the crown 112 and may be configured to impart a force to the crown 112. The force may cause the crown 112 to move (e.g., to oscillate or vibrate translationally and/or rotationally, or to otherwise move to produce a tactile output), which may be detectable by a user when the user is contacting the crown 112. The haptic actuator may produce tactile output by moving the crown 112 in any suitable way. For example, the crown 112 (or a component thereof) may be rotated (e.g., rotated in a single direction, rotationally oscillated, or the like), translated (e.g., moved along a single axis), or pivoted (e.g., rocked about a pivot point). In other cases, the haptic actuator may produce tactile outputs using other techniques, such as by imparting a force to the housing 102 (e.g., to produce an oscillation, vibration, impulse, or other motion), which may be perceptible to a user through the crown 112 and/or through other surfaces of the device 100, such as the cover 108, the housing 102, or the like. Any suitable type of haptic actuator and/or technique for producing tactile output may be used to produce these or other types of tactile outputs, including electrostatics, piezoelectric actuators, oscillating or rotating masses, ultrasonic actuators, reluctance force actuators, voice coil motors, Lorentz force actuators, or the like.

Tactile outputs may be used for various purposes. For example, tactile outputs may be produced when a user presses the crown 112 (e.g., applies an axial force to the crown 112) to indicate that the device 100 has registered the press as an input to the device 100. As another example, tactile outputs may be used to provide feedback when the device 100 detects a rotation of the crown 112 or a gesture being applied to the crown 112. For example, a tactile output may produce a repetitive "click" sensation as the user rotates the crown 112 or applies a gesture to the crown 112. Tactile outputs may be used for other purposes as well.

The electronic device 100 may also include other inputs, switches, buttons, or the like. For example, the electronic device 100 includes a button 110. The button 110 may be a movable button (as depicted) or a touch-sensitive region of the housing 102. The button 110 may control various aspects of the electronic device 100. For example, the button 110 may be used to select icons, items, or other objects displayed on the display 109, to activate or deactivate functions (e.g., to silence an alarm or alert), or the like.

FIGS. 2A-2B show a front and side view, respectively, of a device 200 during one example use condition. The device 200 may be an embodiment of the device 100, and may include the same or similar components and may provide the same or similar functions as the device 100. Accordingly, details of the device 100 described above may apply to the device 200, and for brevity will not be repeated here.

In the example shown in FIGS. 2A-2B, the wearable device 200 includes a crown 212 that a user may contact to provide input through the crown 212. The crown 212 may include a rotationally constrained inner member 211 and a rotationally free outer member 213. The device 200 may also include a rotation sensing element 214 (FIG. 2B) that is configured to detect rotation of the rotationally free outer member 213. The positioning of the rotation sensing element 214 in FIG. 2B is merely for illustration, and it may be positioned elsewhere in the device 200 as described in greater detail herein with respect to FIGS. 4A-10. For example, the rotation sensing element may be positioned in the housing 202 or in the crown 212. In some cases, the rotation sensing element 214 may be configured to detect the motion of a user's finger 201 (or other object) that is rotating the rotationally free outer member 213, instead of or in addition to detecting the rotation of the rotationally free outer member 213.

FIGS. 2A-2B show a user manipulating the crown 212 to provide an input to the device 200. More particularly, a user's finger 201 is in contact with the rotationally free outer member 213 (also referred to herein for simplicity as an outer member) and is moving along a direction indicated by arrow 217. The force applied to the outer member 213 by the user's finger 201 causes the outer member 213 to rotate relative to the rotationally constrained inner member 211 (also referred to herein for simplicity as an inner member). The rotation sensing element 214, in conjunction with other components of a rotation sensor, detects the rotation of the outer member 213 and causes the device 200 to take an action in response to the rotation. For example, as shown in FIG. 2A, upon detection of the outer member 213 rotating, the device 200 may cause a graphical output 207 on a display 209 to be moved in accordance with the rotation of the outer member 213. A rotation of the outer member 213 in the direction indicated by arrow 203 (FIG. 2B) may result in the graphical output 207 moving in the direction indicated by arrow 215 (FIG. 2A). A rotation of the outer member 213 in the opposite direction may result in the graphical output 207 moving in the opposite direction. The rotation of the outer member 213 may be used to change other operational properties of the device 200 in addition to or instead of scrolling a graphical output 207. For example, a rotation of the outer member 213 may change parameters or settings of the device, control a zoom level of a graphical output, change a time setting, or the like.

In some cases, instead of or in addition to a rotation sensing element 214, the device 200 includes a sensor that is configured to sense movement of a finger (or other implement or object) as the finger is rotating the outer member 213. In such cases, the rotation of the outer member 213 may not be directly sensed by the sensor, but instead may be used to provide the sensation of physical rotation to the user. In cases where the sensor is detecting motion of the user's finger rather than rotation of the outer member 213, a sensing element may be positioned so that it is proximate to the user's finger under normal or expected use conditions. For example, the sensing element may be positioned along a side of the device 200 where the user's finger is likely to contact the device 200 when rotating the outer member 213 (e.g., at location 205). In some cases, the sensing element may sense the motion of the user's finger through a cover 208 that covers the display 209. For example, the sensing element may include optical sensing elements and/or touch sensing elements that sense the motion of the user's finger 201 through the optically transmissive and/or dielectric material of the cover 208. In some cases, the device 200 may use the same touch sensor for detecting touch inputs applied to the cover 208 and for detecting motion of the user's finger as it rotates the outer member 213.

Figure 3A:
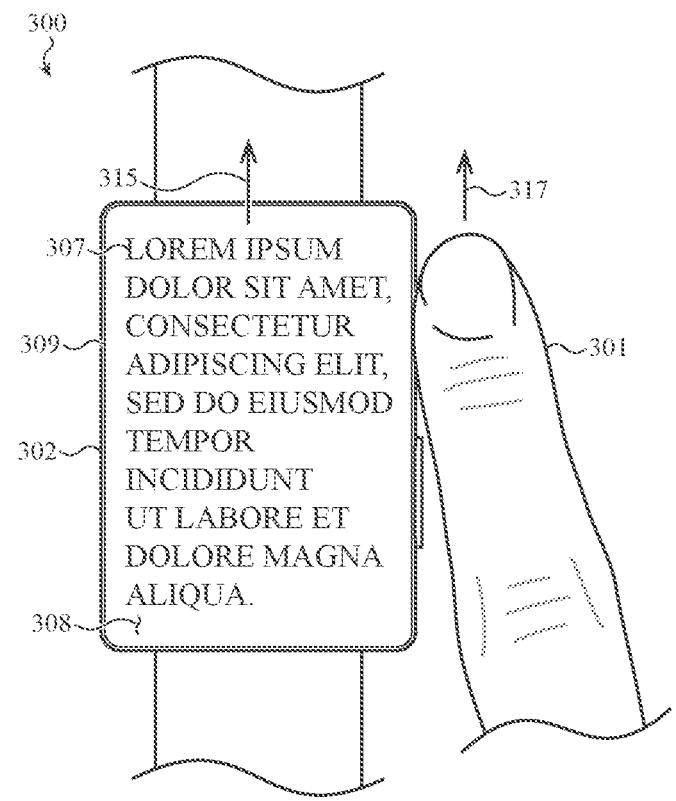
FIGS. 3A-3B depict another wearable electronic device being used.
Figure 3B:
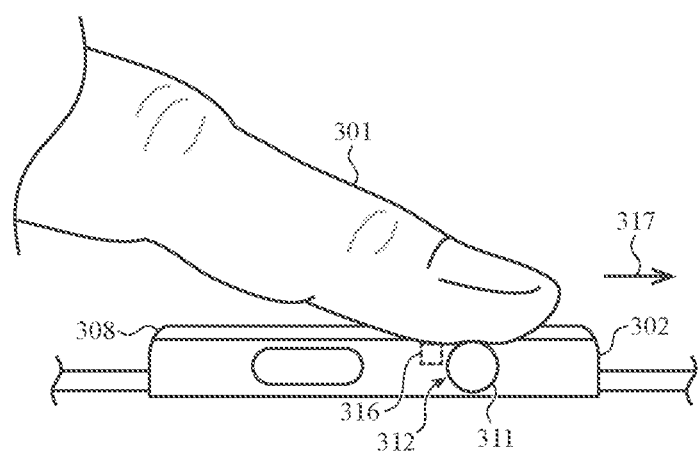

FIGS. 3A-3B show a front and side view, respectively, of a device 300 during one example use condition. The device 300 may be an embodiment of the device 100, and may include the same or similar components and may provide the same or similar functions as the device 100 (or the device 200). Accordingly, details of the devices 100, 200 described above may apply to the device 300, and for brevity will not be repeated here.

In the example shown in FIGS. 3A-3B, the wearable device 300 includes a crown 312 that may be rotationally constrained relative to a housing 302. For example, the housing 302 may be a monolithic structure that includes a protrusion, where the protrusion defines the crown 312. In some cases the crown 312 may be welded, adhered, bonded, or otherwise fixed to the housing 302. In cases where the crown 312 is rotationally constrained but partially rotatable, the crown 312 may be coupled to the housing 302 such that the crown 312 can rotate a small amount in response to input forces (e.g., from a user's finger) or output forces (e.g., from a haptic actuator), but does not fully or freely rotate.

The device 300 may also include a sensing element 316 (FIG. 3B) that is configured to sense a movement of the user's finger 301 as the finger 301 slides along a surface of the crown 312. The positioning of the sensing element 316 in FIG. 3B is merely for illustration, and it may be positioned elsewhere in the device 300 as described in greater detail herein with respect to FIGS. 4A-10. For example, the sensing element 316 may be positioned in the housing 302 or in the crown 312.

Because the crown 312 in FIGS. 3A-3B is rotationally constrained, it will not continuously rotate in response to the force applied by the finger 301 moving along the direction 317 (while the finger is in contact with the crown 312). Rather, the finger 301 will slide along a surface of the crown 312. Accordingly, the sensing element 316 detects the motion of the finger rather than a rotational motion of the crown 312.

The sensing element 316, in conjunction with other components of a sensor, detects the movement of the finger 301 sliding along a surface of the crown 312 (or along another surface of the device 300) and causes the device 300 to take an action in response to the rotation. For example, as shown in FIG. 3A, upon detection of the motion of the finger 301, the device 300 may cause a graphical output 307 on a display 309 to move in accordance with the movement of the finger 301. A movement of the finger 301 in the direction indicated by arrow 317 may result in the graphical output 307 moving in the direction indicated by arrow 315. A movement of the finger 301 in the opposite direction may result in the graphical output 307 moving in the opposite direction. Sliding a finger along a surface of the crown 312 may change other operational properties of the device 300 in addition to or instead of scrolling a graphical output 307. For example, sliding a finger along the surface of the crown 312 may change parameters or settings of the device, control a zoom level of a graphical output, rotate a displayed graphical output, translate a displayed graphical output, change a brightness level of a graphical output, change a time setting, scroll a list of displayed items (e.g., numbers, letters, words, images, icons, or other graphical output), or the like.

Figure 4A:
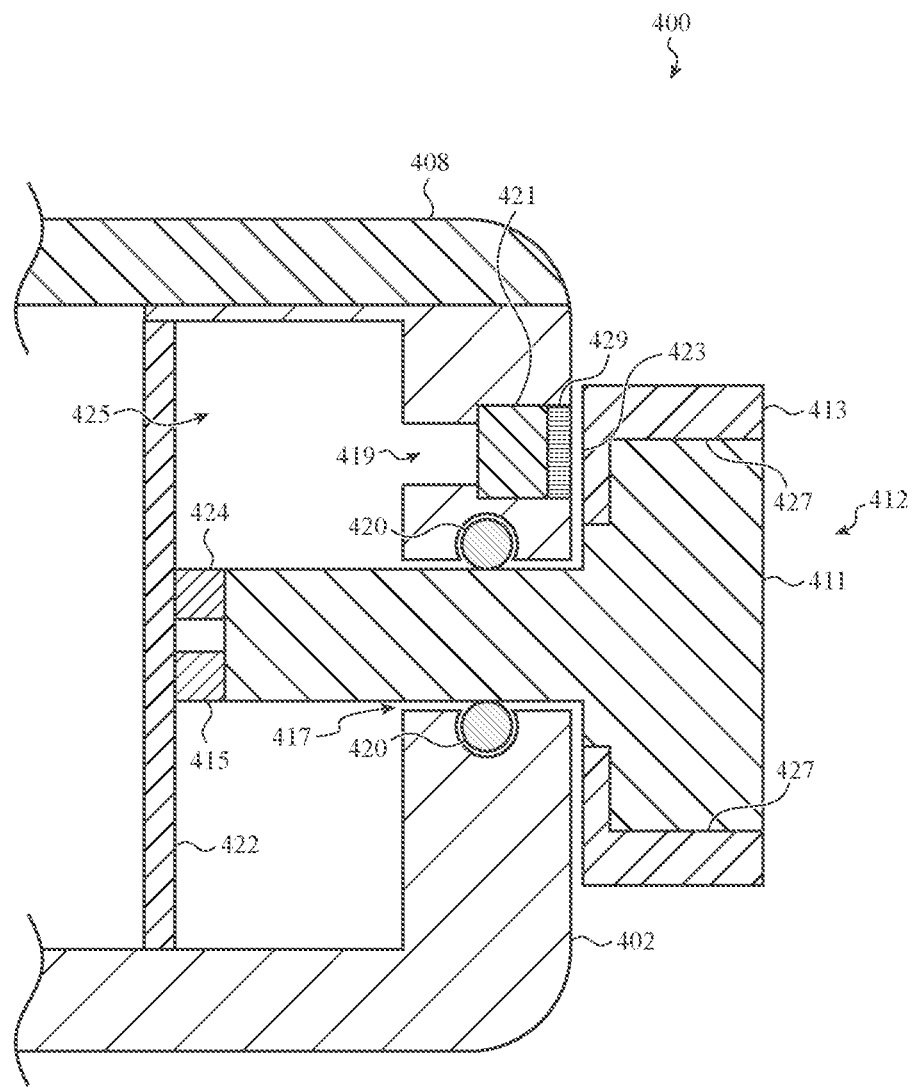
FIGS. 4A-4B are partial cross-sectional views of an example wearable electronic device having a crown with a rotatable member and a sensor for sensing rotation of the rotatable member.

FIG. 4A is a partial cross section of an electronic device 400, corresponding to a view along line A-A in FIG. 1B. The device 400 may be an embodiment of the device 100, and may include the same or similar components and may provide the same or similar functions as the device 100 (or any other wearable device described herein). Accordingly, details of the wearable device 100 described above may apply to the device 400, and for brevity will not be repeated here.

The device 400 includes a crown 412 positioned along a side of a housing 402. The crown 412 may include an inner member 411 that is rotationally constrained relative to the housing 402, and an outer member 413 that is rotationally free relative to the inner member 411. As described above, the inner member 411 may be rotationally fixed relative to the housing 402, or it may be partially rotatable. The inner member 411 and outer member 413 may be formed from or include any materials, including metals (e.g., aluminum, alloys, magnesium, stainless steel, etc.), polymers, composites, glass, sapphire, or the like. In some cases, the inner and outer members 411, 413 are the same material, and in other cases they are different materials.

The inner member 411 may extend outwardly from the side of the housing 402 and may define a circular peripheral surface 427 on an exterior portion of the inner member. The outer member 413 may be coupled to the inner member 411 and may be configured to rotate along the circular peripheral surface 427. For example, the outer member 413 may rotate about an axis that extends through a center of the circle that corresponds to or is defined by the circular peripheral surface 427. Further, the circular peripheral surface 427 may be received in a circular opening defined in the outer member 413. In some cases, an inner surface of the circular opening may contact the circular peripheral surface 427, such that the inner surface slides along the circular peripheral surface 427 when the outer member 413 rotates along the circular peripheral surface 427. In other cases, the outer member 413 does not directly contact the circular peripheral surface 427 when the outer member 413 rotates along the circular peripheral surface 427. In either case, the crown 412 may include one or more bearings, bushings, or other components that facilitate rotation of the outer member 413 along the circular peripheral surface 427.

As described above, the outer member 413 may be outside of an interior volume 425 of the device 400, such that the rotation of the outer member 413 occurs outside of the interior volume 425 (such as exclusively outside of the interior volume, such that no portion of the outer member 413 extends into the interior volume or rotates within the interior volume). In some cases, such as where the inner member 411 is rotationally fixed relative to the housing 402, the outer member 413 may be the only component of the crown 412 that can rotate. Placing the rotating component(s) entirely outside of the interior volume may eliminate the need to have a rotating interface between a crown shaft and the housing 402, which may allow for simpler rotational mechanisms, better environmental seals between the crown and the housing, and the like.

The device 400 may include a rotation sensing element 421 that, in conjunction with sensing circuitry and/or other components of a rotation sensor, senses a rotation of the outer member 413 relative to the inner member 411. The rotation sensing element 421 may use any suitable type of sensing technology or technique, including those described herein with respect to FIGS. 11A-11D. For example, the rotation sensing element 421 may be or may be part of a Hall effect sensor, an optical sensor (e.g., an encoder), a capacitive sensor, a resistive sensor, an inductive sensor, or any other suitable type of sensor. In some cases, the outer member 413 may have features or components that facilitate the rotation sensing by the rotation sensing element 421. For example, the outer member 413 may include magnets or ferromagnetic materials to facilitate rotation sensing by a Hall effect sensor, or a pattern of grooves or other features to facilitate rotation sensing by an optical sensor. Such features or components may be positioned along a side surface 423 of the outer member 413, or at any other position or location to facilitate sensing by the rotation sensing element 421.

The rotation sensing element 421 is configured to sense rotation of the outer member 413, which as noted above may be entirely outside of the interior volume 425 of the device 400. As shown in FIG. 4A, the rotation sensing element 421 is configured to detect or sense a side surface 423 of the outer member 413. The device may also include a protective cover 429 over the rotation sensing element 421 and defining a portion of an exterior surface of the housing. The rotation sensing element 421 may sense the rotation of the outer member 413 through the protective cover 429. For example, the protective cover 429 may be an optically transmissive window such that an optical rotation sensor can sense the rotation of the outer member 413 through the optically transmissive window. Seals (e.g., elastomer members, adhesives, etc.) may be included around the rotation sensing element 421 and/or a protective cover to prevent or limit ingress of liquids, debris, or other contaminants.

The rotation sensing element 421 may be positioned at least partially in an opening 419 in the housing 402 that extends from the interior volume 425 to an exterior of the housing. The rotation sensing element 421 may thus sense the rotation of the outer member 413 through the opening 419. The opening 419 may also allow conductors (e.g., wires, flexible circuit boards, traces, etc.) to pass from the rotation sensing element 421 to sensing circuitry or other components within the housing 402 of the device 400. The rotation sensing element 421 may be positioned in a device in a location or configuration other than that shown in FIG. 4A. For example, a rotation sensing element 421 may be positioned in the device 400 so that it senses rotation of the outer member 413 through an optically transmissive or non-conductive portion of the cover 408.

The crown 412 may include a component that extends into the housing 402 through an opening 417. For example, the inner member 411 may include a shaft portion that extends through the opening 417. A sealing member 420, such as an elastomeric member or other material or component(s), may form a seal between the shaft (or another portion of the inner member 411) and the housing 402 to prevent ingress of liquids, debris, or other contaminants. The sealing member 420 may seal the opening 417 while also allowing the inner member 411 to move relative to the housing 402. For example, while the inner member 411 may be rotationally constrained (e.g., rotationally fixed or partially rotatable), it may still be able to translate axially. As such, the sealing member 420 may seal the opening while allowing the inner member 411 to move axially. In other cases, the inner member 411 may be fixed to the housing 402, such as with adhesive, welds, fusion bonds, or the like. In such cases, the sealing member 420 may be omitted.

The axial translation of the inner member 411, where axial translation is permitted, may facilitate input and output functionalities. For example, the device 400 may include a force sensing component 424 positioned at least partially within the housing 402 and coupled to the inner member 411 (or any other translatable portion of the crown 412). The force sensing component 424 may detect axial forces applied the crown 412 (e.g., forces applied along a direction indicated by arrow 105, FIG. 1A). The axial translation of the inner member 411 may facilitate the detection of the axial force by allowing the inner member 411 to move to deform, deflect, collapse, or otherwise physically affect a force sensing component 424. The force sensing component 424 may be positioned between a fixed support 422 and the inner member 411, such that an axial force applied to the crown 412 compresses the force sensing component 424. Other configurations are also possible.

The force sensing component 424 may be or may include any suitable component(s) for sensing an amount of applied force, including a strain gauge, a piezoelectric component, a piezoresistive component, quantum tunneling materials, a force sensing resistor (FSR), or the like. The force sensing component 424 may be coupled to force sensing circuitry or other components to define a force sensor.

The force sensor (which includes the force sensing component) may determine a magnitude of force associated with an axial force that is applied to the crown 412. If the magnitude of the force is greater than a threshold value, the force sensor may cause the device 400 to perform an action. For example, the force sensor may cause the device to register an input, change a graphical output on a display, change an operational state of the device, or the like. In some cases, the force sensor may cause a haptic actuator (e.g., a haptic actuator 415) to produce a tactile output. The tactile output may act as physical feedback to the user that an input or selection has been registered by the device 400.

The device 400 may also include a haptic actuator 415. The haptic actuator 415 may be coupled to the inner member 411, or any other component of the crown 412, to produce tactile outputs detectable through the crown 412. The haptic actuator 415 may be or may include any suitable components to produce a haptic output, including electrostatic actuators, piezoelectric actuators, oscillating or rotating masses, ultrasonic actuators, reluctance force actuators, voice coil motors, Lorentz force actuators, or the like. Moreover, the haptic actuator 415 may be configured to move the crown 412 along any suitable direction or axis to produce the tactile output, including axially, rotationally (e.g., plus and minus 2 degrees about a neutral position), pivotally, translationally, or the like.

Figure 4B:
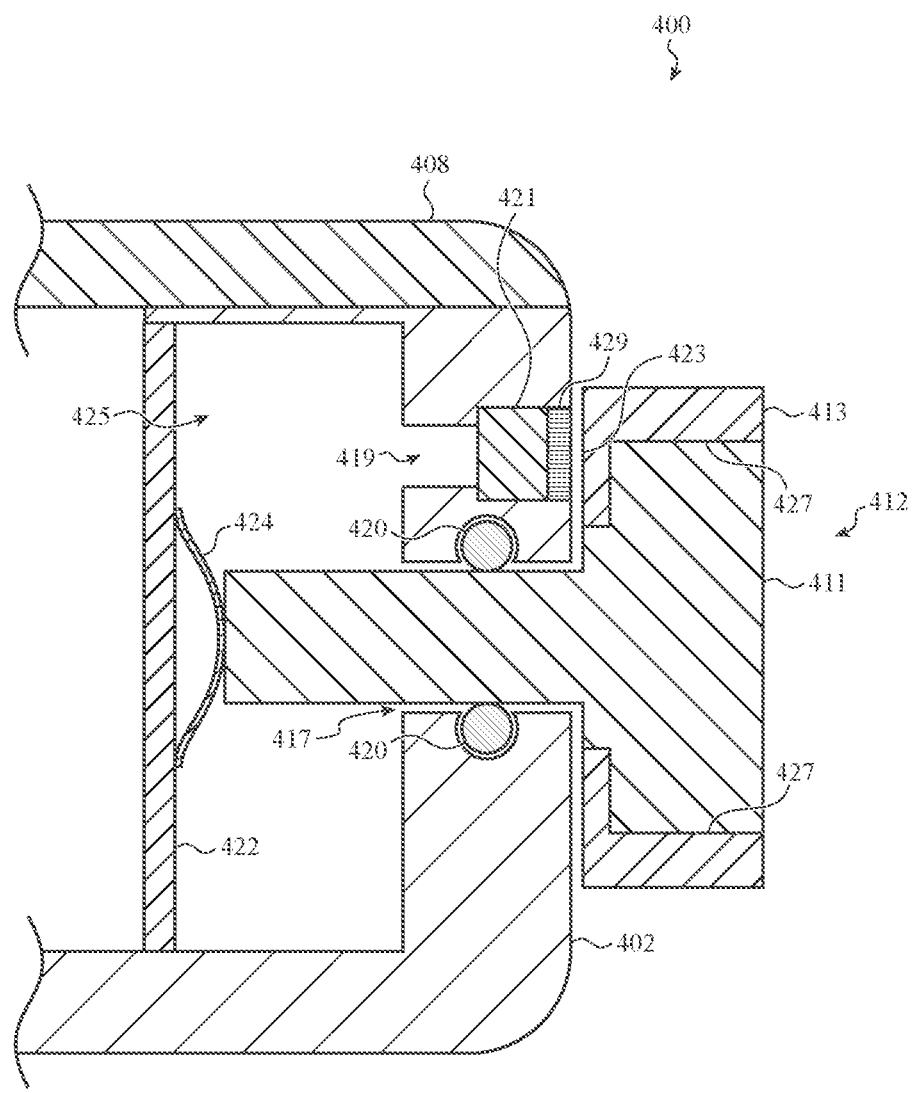

FIG. 4B depicts another example embodiment of the wearable device 400 of FIG. 4A. In FIG. 4B, however, the force sensing component is a dome switch 431. The dome switch 431 may provide both an input detection and a tactile output function. For example, when an axial force exceeding a collapse threshold of the dome switch 431 is applied to the crown 412, the dome switch 431 may abruptly collapse, which both closes an electrical contact (thereby allowing the device to register the input), and produces a tactile "click" or other tactile output that may be felt by the user. Accordingly, the dome switch 431 may be used instead of or in conjunction with a separate force sensor and/or haptic actuator.

Figure 5:
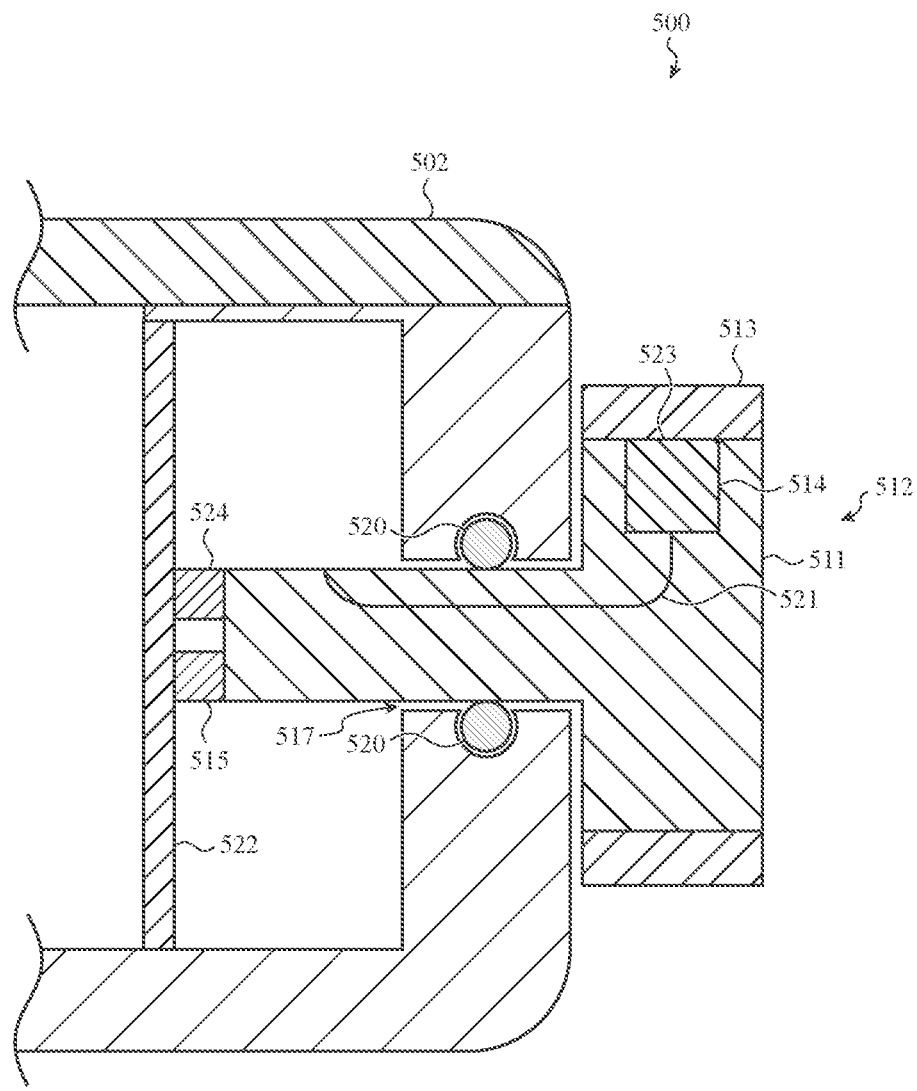
FIG. 5 is a partial cross-sectional view of another example wearable device having a crown with a rotatable member and a sensor for sensing rotation of the rotatable member.

FIG. 5 is a partial cross section of an electronic device 500, corresponding to a view along line A-A in FIG. 1B. The device 500 may be an embodiment of the device 100, and may include the same or similar components and may provide the same or similar functions as the device 100 (or any other wearable device described herein). Accordingly, details of the wearable device 100 described above may apply to the device 500, and for brevity will not be repeated here.

Like the devices shown in FIGS. 4A-4B, the device 500 includes a crown 512 positioned along a side of a housing 502. The crown 512 may include an inner member 511 that is rotationally constrained relative to the housing 502, and an outer member 513 that is rotationally free relative to the inner member 511. As shown, the outer member 513 is a sleeve that is positioned around a cylindrical surface of the inner member 811.

The device may include a housing 502, a cover 508, a sealing member 520, a force sensing component 524, a haptic actuator 515, and a fixed support 522, each of which may be the same as or similar to the corresponding components of the device 400, described above. Accordingly, details of those components are equally applicable to the device 500 and for brevity will not be repeated here.

The device 500 may also include a rotation sensing element 514 that, in conjunction with sensing circuitry and/or other components of a rotation sensor, is configured to sense a rotation of the outer member 513 relative to the inner member 511. In the device 500, the rotation sensing element 514 is positioned at least partially within the inner member 511. The rotation sensing element 514 may detect rotation as a surface 523 of the outer member 513 moves past the rotation sensing element 514. As described above with respect to the outer member 413, the outer member 513 may have features or components that facilitate the rotation sensing by the rotation sensing element 514. For example, the outer member 513 may include magnets or ferromagnetic materials to facilitate rotation sensing by a Hall effect sensor, or a pattern of grooves or other features to facilitate rotation sensing by an optical sensor. Such features or components may be positioned along the surface 523 of the outer member 513, or at any other position or location to facilitate sensing by the rotation sensing element 514.

The rotation sensing element 514 may be coupled to sensing circuitry or other components within the interior volume of the housing 502 via a conductor 521 (e.g., a wire, conductive trace, flexible circuit element, etc.). The conductor 521 may be positioned within the inner member 511 (or along a surface of the inner member 511), and may terminate to another conductor along a side of a shaft of the inner member 511. In this way, the rotation sensing element 514 may be coupled to other components of the rotation sensor within the housing 502 without requiring an additional opening in the housing 502.

Figure 6:
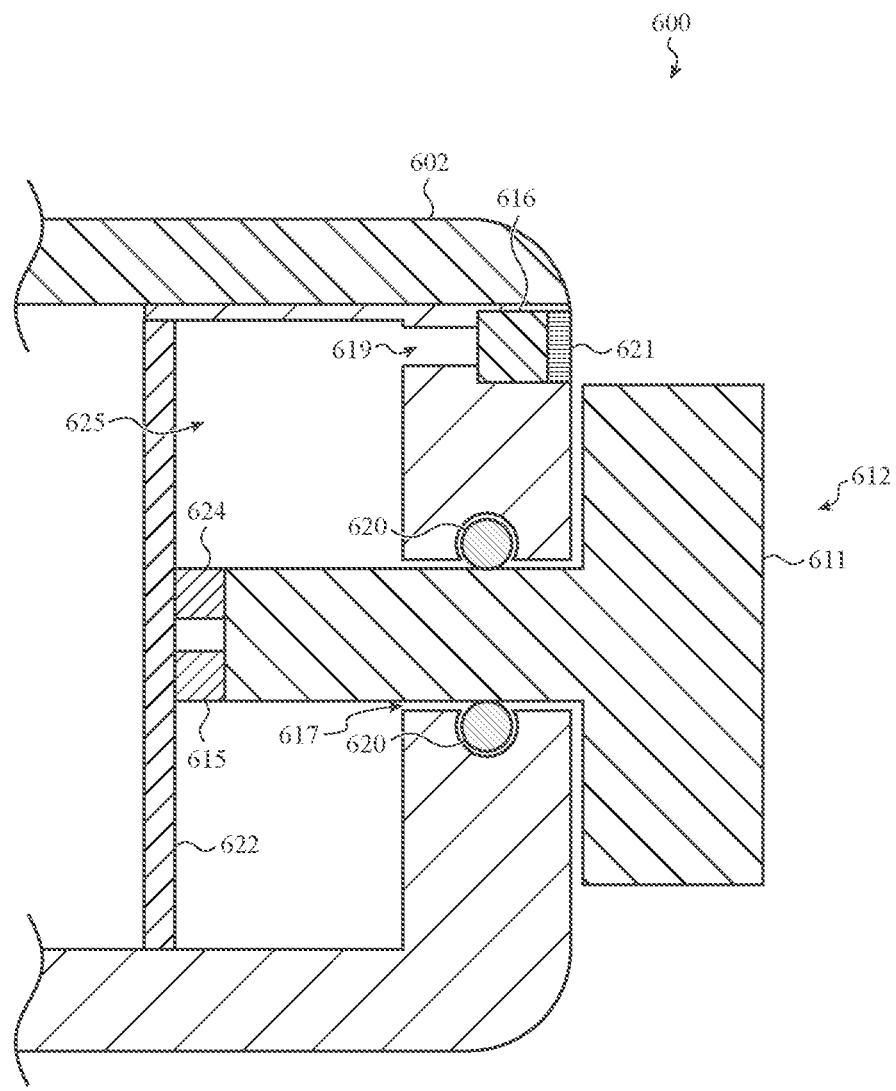
FIG. 6 is a partial cross-sectional view of an example wearable device having a crown with a rotationally constrained member and a sensor for sensing motion of a user's finger.

FIG. 6 is a partial cross section of an electronic device 600, corresponding to a view along line A-A in FIG. 1B. The device 600 may be an embodiment of the device 100, and may include the same or similar components and may provide the same or similar functions as the device 100 (or any other wearable device described herein). Accordingly, details of the wearable device 100 described above may apply to the device 600, and for brevity will not be repeated here.

Like the devices shown in FIGS. 4A-5, the device 600 includes a crown 612 positioned along a side of a housing 602. The device may include a cover 608, a sealing member 620, a force sensing component 624, a haptic actuator 615, and a fixed support 622, each of which may be the same as or similar to the corresponding components of the devices 400, 500 described above. Accordingly, details of those components are equally applicable to the device 600 and for brevity will not be repeated here.

FIGS. 4A-5 show crowns in which at least one component is rotationally free, and where the rotation of the rotationally free member is sensed in order to detect inputs applied to the crown. FIG. 6 includes a crown 612 that includes a rotationally constrained member 611 (e.g., a rotationally fixed or partially rotatable member) and a sensing element 616 that is configured to detect the movement of a user's finger (or other object or implement), rather than the rotation of a crown component. More particularly, as described above, when a user interacts with the rotationally constrained member 611 of the crown by attempting to spin or rotate the crown (which may be an intuitive way to interact with the crown 612), the user's fingers may simply slide along a surface of the rotationally constrained member 611, as the rotationally constrained member 611 cannot continuously rotate in response to the applied force. Accordingly, although there is no continuous rotation to sense, the motion of the user's finger may be indicative of the input that the user is applying to the crown 612. For example, the speed and/or direction of the motion of the user's finger may be used to control the operation of the device 600 in a manner similar to the speed and/or direction of a rotation of a crown.

In order to detect the movement of the user's finger as it slides along a surface of the crown 612 (e.g., a surface of the rotationally constrained member 611), the device 600 may include a sensing element 616. The sensing element may be coupled to the housing 602 and may be positioned in a location where a finger is likely to be within a sensing distance from the sensing element 616 when the user is interacting with the crown 612. For example, due to the location of the crown 612, a user's finger (either an index finger as shown in FIGS. 2A-3B or a thumb, such as when a user is applying a twisting gesture with a thumb and index finger) may be proximate the sensing element 616 when the user is interacting with the crown 612. Accordingly, the sensing element 616 may be able to sense the movement of the user's finger in all or most use conditions. In some cases, multiple sensing elements are positioned at different locations proximate the crown 612 to help detect finger movement under different use conditions. Such multiple sensing elements may be positioned at various locations around the crown 612, such as above, below, to the left, and to the right of the crown 612.

The sensing element 616 may use any suitable type of sensing technology or technique, including those described herein with respect to FIGS. 11A-11D. For example, the sensing element 616 may be or may be part of an optical sensor, a capacitive sensor, a resistive sensor, an inductive sensor, or any other suitable type of sensor. In some cases, the sensing element 616 may be part of or integrated with a touch sensor that is used to detect touch inputs applied to an input surface defined by the cover 608. More particularly, as noted above, a wearable device may include a touch sensor associated with a display to produce a touch-screen style display. The touch sensor of the display may be configured so that some of the sensing elements (e.g., capacitive sense pixels) are sufficiently close to the crown 612 to detect a user's finger when the user's finger is sliding along a surface of the crown 612. The sensing elements may be additional sensing elements that are dedicated to detecting finger movements associated with crown manipulations, or they may be sensing elements that are also used to detect touch inputs applied to a user input surface associated with the display.

The sensing element 616 is configured to sense movement of a user's finger or other object that is entirely outside of the interior volume 625 of the device 600. The device 600 may also include a protective cover 621 over the sensing element 616 and defining a portion of an exterior surface of the housing. The sensing element 616 may sense the movement of the user's finger through the protective cover 621. For example, the protective cover 621 may be an optically transmissive window such that an optical sensor can sense the movement of the user's finger through the optically transmissive window. Seals (e.g., elastomer members, adhesives, etc.) may be included around the sensing element 616 and/or a protective cover to prevent or limit ingress of liquids, debris, or other contaminants.

The sensing element 616 may be positioned at least partially in an opening 619 in the housing 602 that extends from the interior volume 625 to an exterior of the housing. The sensing element 616 may thus sense movement of a user's finger (or other implement or object such as a stylus) through the opening 619. The opening 619 may also allow conductors (e.g., wires, flexible circuit boards, traces, etc.) to pass from the sensing element 616 to sensing circuitry or other components within the housing 602 of the device 600.

Figure 7:
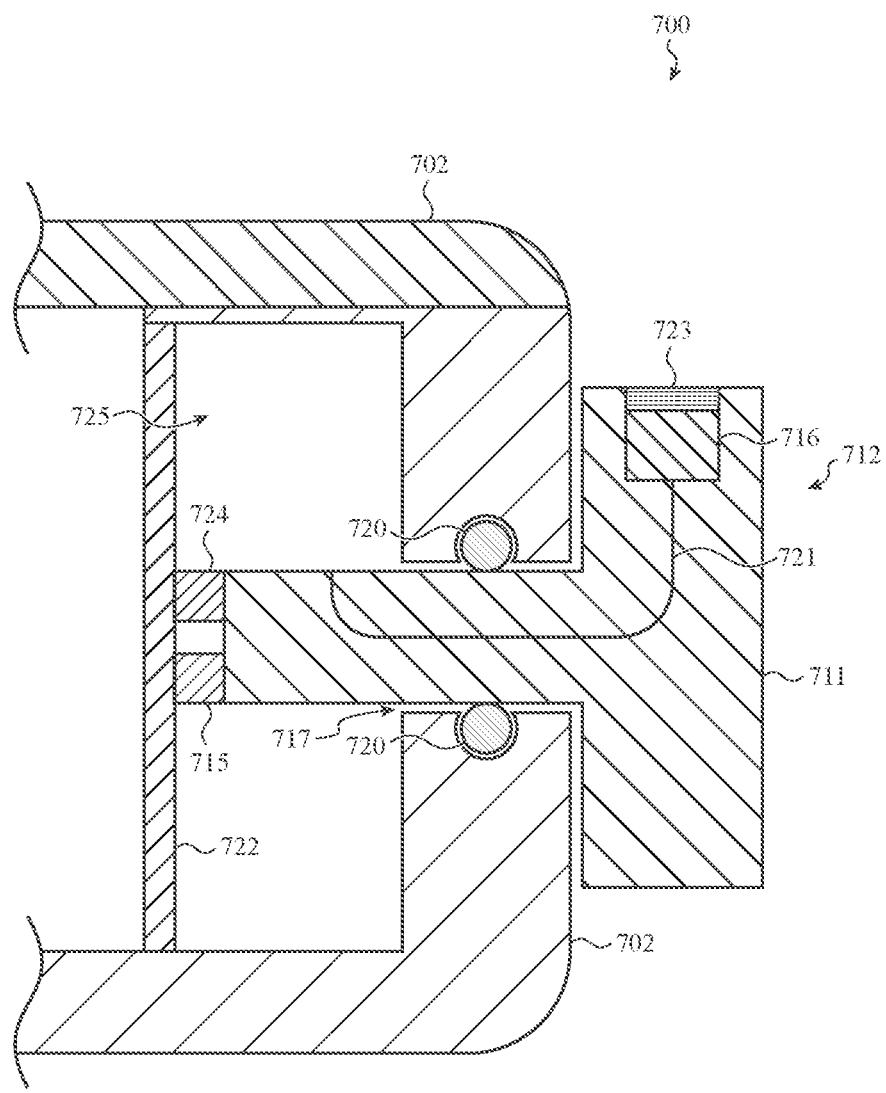
FIG. 7 is a partial cross-sectional view of another example wearable device having a crown with a rotationally constrained member and a sensor for sensing motion of a user's finger.

FIG. 7 is a partial cross section of an electronic device 700, corresponding to a view along line A-A in FIG. 1B. The device 700 may be an embodiment of the device 100, and may include the same or similar components and may provide the same or similar functions as the device 100 (or any other wearable device described herein). Accordingly, details of the wearable device 100 described above may apply to the device 700, and for brevity will not be repeated here.

Like the device shown in FIGS. 4A-6, the device 700 includes a crown 712 positioned along a side of a housing 702. The device may include a cover 708, a sealing member 720, a force sensing component 724, a haptic actuator 715, and a fixed support 722, each of which may be the same as or similar to the corresponding components of the devices 400, 500, 600 described above. Accordingly, details of those components are equally applicable to the device 700 and for brevity will not be repeated here.

FIG. 7 includes a crown 712 that includes a rotationally constrained member 711 (e.g., a rotationally fixed or partially rotatable member) and a sensing element 716 that is configured to detect the movement of a user's finger (or other object or implement) as it slides over a surface of the crown 712. Instead of positioning the sensing element 716 on the housing, as shown in FIG. 6, the device 700 includes the sensing element at least partially within the rotationally constrained member 711 of the crown 712. The sensing element 716 may be configured to detect the motion of a user's finger in the same or a similar manner to the sensing element 616 described with respect to FIG. 6.

The device 700 may also include a protective cover 723 over the sensing element 716 and defining a portion of an exterior surface of the crown 712 (with an outer peripheral surface of the rotationally constrained member 711 defining another portion of the exterior surface of the crown 712). The sensing element 716 may sense the movement of the user's finger through the protective cover 723. For example, the protective cover 723 may be an optically transmissive window such that an optical sensor can sense the movement of the user's finger through the optically transmissive window. Seals (e.g., elastomer members, adhesives, etc.) may be included around the sensing element 716 and/or the protective cover to prevent or limit ingress of liquids, debris, or other contaminants.

The sensing element 716 and/or the protective cover 723 may extend any distance around the circumference of the rotationally constrained member 711. For example, the sensing element 716 and/or the protective cover 723 may extend around the entire circumference of the rotationally constrained member 711, or it may extend less than the complete circumference.

The sensing element 716 may be coupled to sensing circuitry or other components within the interior volume of the housing 702 via a conductor 721 (e.g., a wire, conductive trace, flexible circuit element, etc.). The conductor 721 may be positioned within the rotationally constrained member 711 (or along a surface of the member 711), and may terminate to another conductor along a side of a shaft of the member 711. In this way, the sensing element 716 may be coupled to other components of the sensor within the housing 702 without requiring an additional opening in the housing 702.

Figure 8:
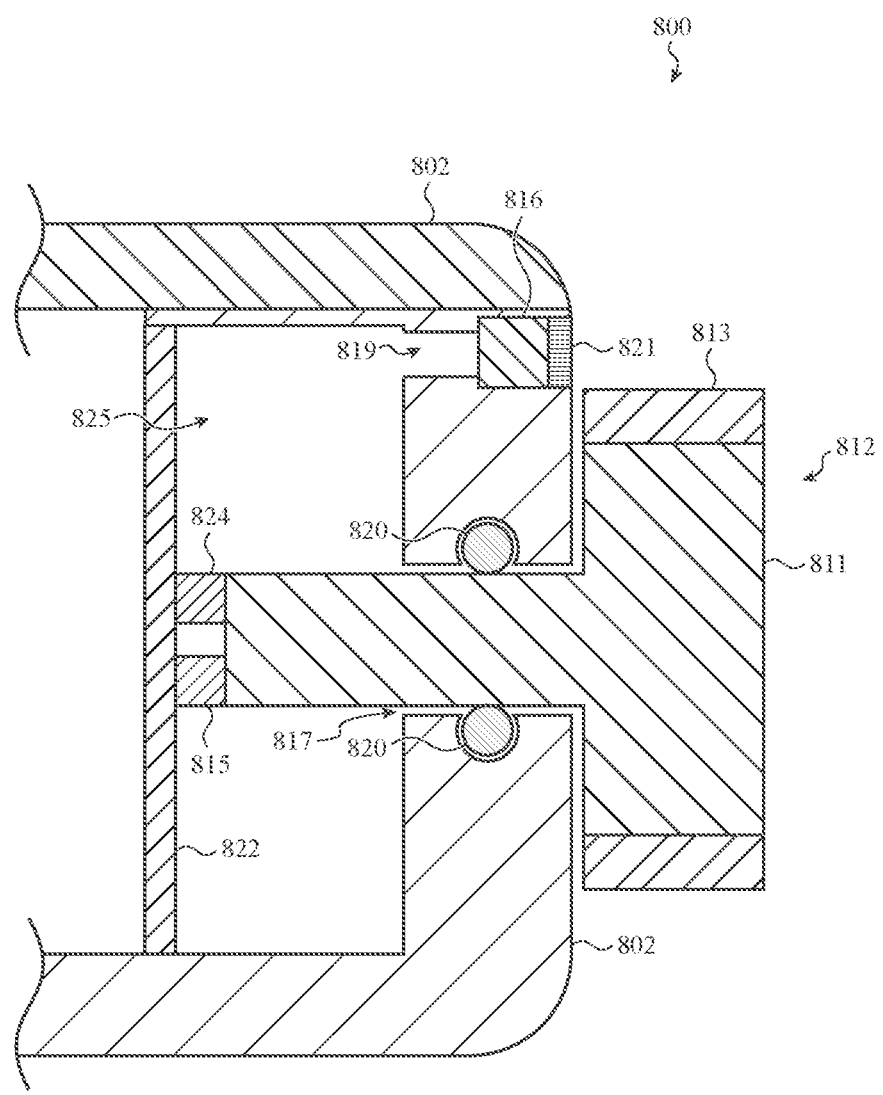
FIG. 8 is a partial cross-sectional view of an example wearable device having a crown with a rotatable member and a sensor for sensing motion of a user's finger.

FIG. 8 is a partial cross section of an electronic device 800, corresponding to a view along line A-A in FIG. 1B. The device 800 may be an embodiment of the device 100, and may include the same or similar components and may provide the same or similar functions as the device 100 (or any other wearable device described herein). Accordingly, details of the wearable device 100 described above may apply to the device 800, and for brevity will not be repeated here.

Like the device shown in FIGS. 4A-7, the device 800 includes a crown 812 positioned along a side of a housing 802. The device may include a cover 808, a sealing member 820, a force sensing component 824, a haptic actuator 815, and a fixed support 822, each of which may be the same as or similar to the corresponding components of the devices 400, 500, 600, 700 described above. Accordingly, details of those components are equally applicable to the device 800 and for brevity will not be repeated here.

The crown 812 may include an inner member 811 that is rotationally constrained relative to the housing 802, and an outer member 813 that is rotationally free relative to the inner member 811. As shown, the outer member 813 is a sleeve that is positioned around a cylindrical surface of the inner member 811.

Instead of (or in addition to) detecting the rotation of the rotationally free outer member 813 to control the operation of the device 800, the device 800 uses a sensing element 816 (which may be covered by a protective cover 821) that senses motion of a user's finger as the finger is rotating the outer member 813. In this case, the rotation of the outer member 813 may provide a familiar sensation of physical rotation to the user, but the rotation may not be used for actual detection or sensing of the input.

The inner member 811 and the outer member 813 of the device 800 may be the same as or similar to the inner and outer members of the devices 400 and 500, and the sensing element 816 and protective cover 821 may be the same as or similar to the sensing element 616 and protective cover 621 of the device 600. In some cases, the sensing element 816 may be part of or integrated with a touch sensor associated with a touch-sensitive display, as described above. Accordingly, details of those components are equally applicable to the device 800 and for brevity will not be repeated here.

Figure 9:
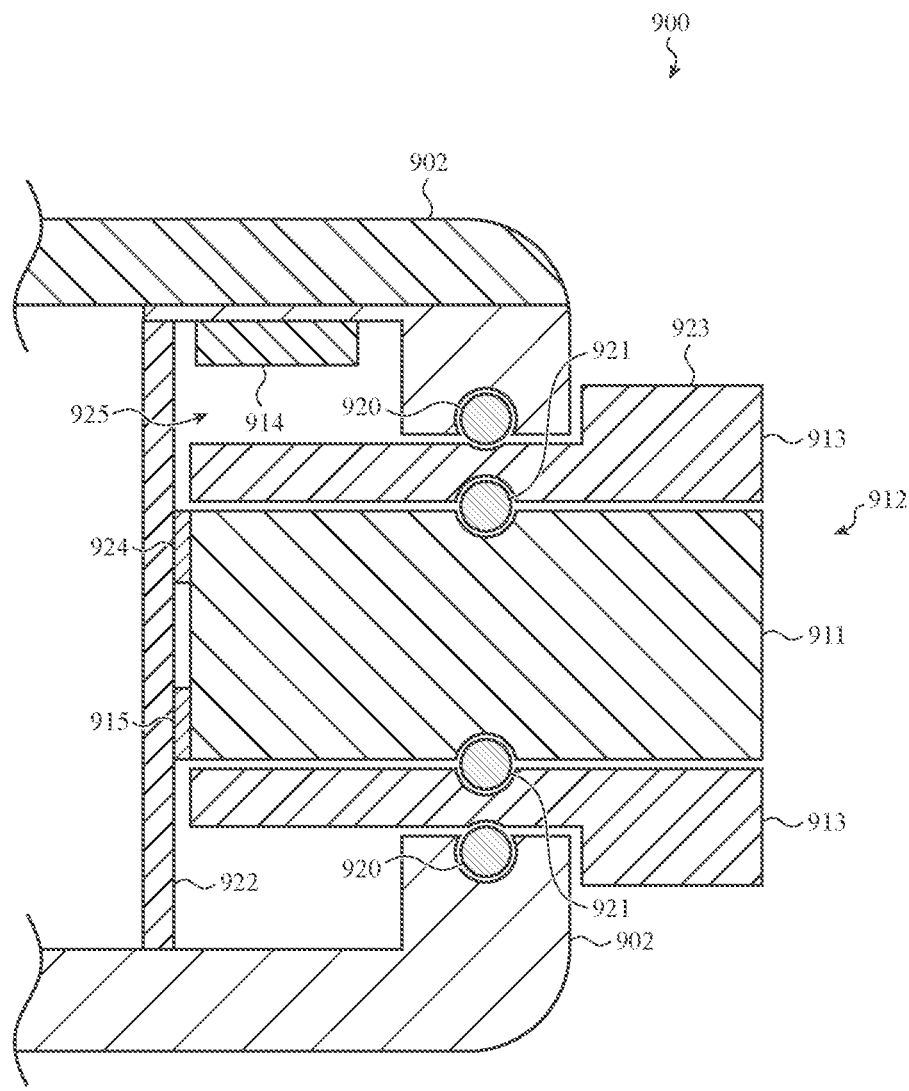
FIG. 9 is a partial cross-sectional view of an example wearable electronic device having a crown with a rotatable member and a sensor for sensing rotation of the rotatable member.

FIG. 9 is a partial cross section of an electronic device 900, corresponding to a view along line A-A in FIG. 1B. The device 900 may be an embodiment of the device 100, and may include the same or similar components and may provide the same or similar functions as the device 100 (or any other wearable device described herein). Accordingly, details of the wearable device 100 described above may apply to the device 900, and for brevity will not be repeated here.

Like the device shown in FIGS. 4A-8, the device 900 includes a crown 912 positioned along a side of a housing 902. The device may include a cover 908, a force sensing component 924, a haptic actuator 915, and a fixed support 922, each of which may be the same as or similar to the corresponding components of the devices 400, 500, 600, 700, 800 described above. Accordingly, details of those components are equally applicable to the device 900 and for brevity will not be repeated here.

The crown 912 may include an inner member 911 that is rotationally constrained relative to the housing 902, and an outer member 913 that is rotationally free relative to the inner member 811. The outer member 913 may include a first portion 923 that is outside (e.g., external to) the housing 902 and defines an input surface of the crown 912. For example, the first portion 923 may define a substantially circular peripheral surface that a user may grasp or touch to rotate when providing an input to the device 900 via the crown 912. The outer member 913 may also include a shaft portion 927 that extends into the interior volume 925 of the device 900. The device 900 may include bearings, bushings, or other components that facilitate the rotation of the outer member 913. For example, the device 900 may include a bearing or bushing or other rolling or sliding component between the housing 902 and the outer member 913, and between the outer member 913 and the inner member 911.

Because the shaft portion 927 rotates in conjunction with the first portion 923, a rotation sensing element 914 within the housing 902 may, in conjunction with rotation sensing circuitry, sense the rotation of the outer member 913 by sensing the rotation of the shaft portion 927. The rotation sensing element 914 may use any suitable type of sensing technology or technique, including those described herein with respect to FIGS. 11A-11D. For example, the rotation sensing element 914 may be or may be part of an optical sensor, a capacitive sensor, a resistive sensor, an inductive sensor, or any other suitable type of sensor.

The device 900 may also include a first sealing member 920 between the housing 902 and the outer member 913, and a second sealing member 921 between the outer member 913 and the inner member 911. The sealing members 920, 921, which may be elastomeric members or other suitable material or component(s), may prevent or reduce the ingress of liquids, debris, or other contaminants. The sealing members 920, 921 may seal the openings between the housing 902, outer member 913, and inner member 911 while also allowing the outer member 913 to rotate relative to the inner member 911, and while allowing both the inner and outer members 911, 913 to translate relative to the housing 902. For example, while the inner member 911 may be rotationally constrained (e.g., rotationally fixed or partially rotatable), it may still be able to translate axially. The outer member 913 may also be able to translate axially along with the inner member 911, and may in fact be coupled to the inner member 911 such that an axial force applied to either the inner member or the outer member may cause both the inner member 911 and the outer member 913 to translate axially. As such, the sealing members 920, 921 may seal the openings between the various components while allowing the outer member 913 to translate axially and to rotate, and while allowing the inner member 911 to translate axially.

Figure 10:
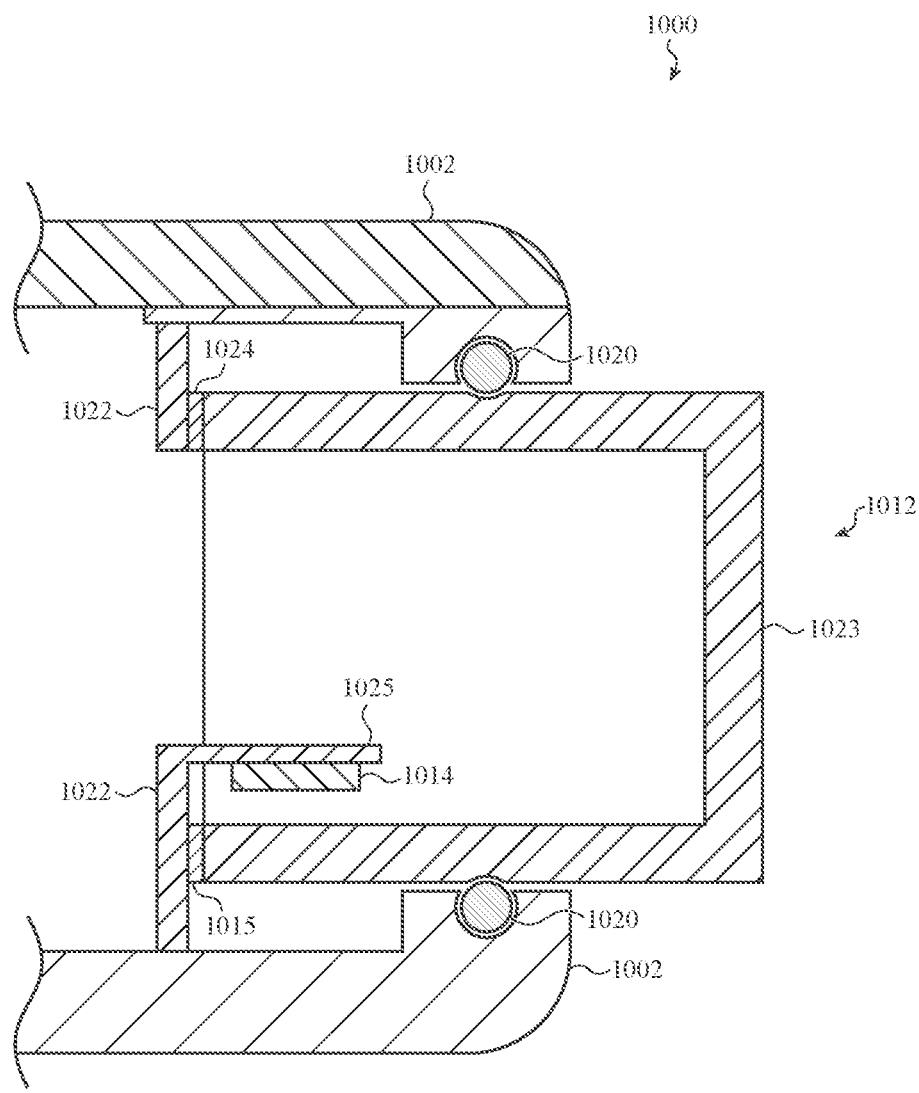
FIG. 10 is partial cross-sectional view of another example wearable electronic device having a crown with a rotatable member and a sensor for sensing rotation of the rotatable member.

FIG. 10 is a partial cross section of an electronic device 1000, corresponding to a view along line A-A in FIG. 1B. The device 1000 may be an embodiment of the device 100, and may include the same or similar components and may provide the same or similar functions as the device 100 (or any other wearable device described herein). Accordingly, details of the wearable device 100 described above may apply to the device 1000, and for brevity will not be repeated here.

Like the device shown in FIGS. 4A-9, the device 1000 includes a crown 1012 positioned along a side of a housing 1002. The device may include a cover 1008, a force sensing component 1024, a haptic actuator 1015, and a fixed support 1022, each of which may be the same as or similar to the corresponding components of the devices 400, 500, 600, 700, 800, 900 described above. Accordingly, details of those components are equally applicable to the device 1000 and for brevity will not be repeated here.

The crown 1012 may include a rotatable member 1023 that is configured to rotate relative to the housing 1002. Bearings, bushings, or other components may be used between the rotatable member 1023 and the housing 1002 to facilitate the rotation of the rotatable member 1023 in response to a rotating force applied by a user. Further, the device 1000 may include a sealing member 1020 between the rotatable member 1023 and the housing 1002. The sealing member 1020, which may be elastomeric members or any other suitable material or component(s), may prevent or reduce the ingress of liquids, debris, or other contaminants into the device 1000. The sealing member 1020 may seal the opening between the housing 1002, rotatable member 1023, while also allowing the rotatable member 1023 to rotate and optionally translate axially relative to the housing 1002.

The device 1000 may also include a rotation sensing element 1014 that, along with rotation sensing circuitry and/or other components, senses rotation of the rotatable member 1023. For example, the rotation sensing element 1014 may sense the rotation of an inner wall 1027 of the rotatable member 1023 (or any other portion of the rotatable member 1023. The rotation sensing element 1014 may use any suitable type of sensing technology or technique, including those described herein with respect to FIGS. 11A-11D. For example, the rotation sensing element 1014 may be or may be part of an optical sensor, a capacitive sensor, a resistive sensor, an inductive sensor, or any other suitable type of sensor.

As noted above, the sensors and/or sensing elements that sense either rotation of a crown component and/or motion of a user's finger (or other object or implement) may use any suitable sensing technology or technique. FIGS. 11A-11D illustrate example sensors that use various techniques to sense motion of an object (e.g., either rotation of a crown component or movement of a user's finger). These example sensors may be used in any of the devices described herein.

Figure 11A:
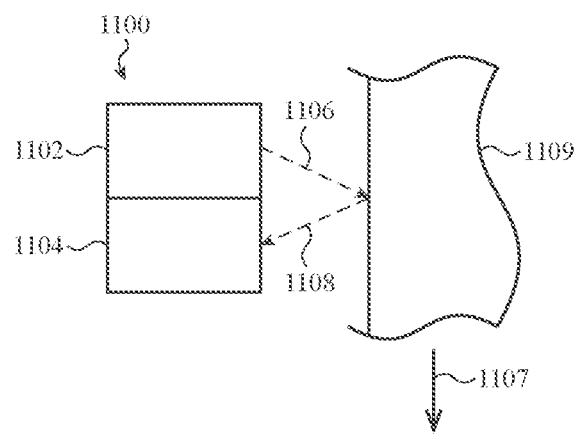
FIGS. 11A-11D depict example sensors for sensing user interactions with a crown.

FIG. 11A shows an optical sensing element 1100 to sense movement of an object 1109. The object 1109 may be a user's finger, a stylus, a rotatable component of a crown, or the like. The object 1109 may be moving relative to the sensing element 1100 along a direction indicated by arrow 1107, which may correspond to a movement of a user's finger (e.g., a translational movement), or a rotation of a rotating component of a crown.

The optical sensing element 1100 includes a light emitter 1102 and a light detector 1104. The light emitter may emit light 1106 (e.g., visible light, laser light, ultraviolet light, non-visible light, or the like) towards the object 1109. The light detector 1104 receives light 1108 that is reflected by the object 1109 and may sense a speed and/or direction of motion of the object 1109 using detected properties of the received light (e.g., an intensity of the receive light, an angle of the received light, an amount of received light, a change in a property of the light, etc.) or images of the object 1109 that are captured by the light detector 1104. The light detector 1104 may include an image sensor or any other suitable light sensing components.

The object 1109 may have features that facilitate the sensing of the motion of the object 1109. For example, in cases where the object 1109 is a rotatable member of a crown, the features may include grooves, scratches, graphical patterns, bumps, cavities, or the like. Such features may affect the way that the object 1109 reflects light, which may facilitate detection of the movement of the object 1109 by the light detector 1104. In cases where the object 1109 is a finger, the features may be the natural textures of skin.

Figure 11B:
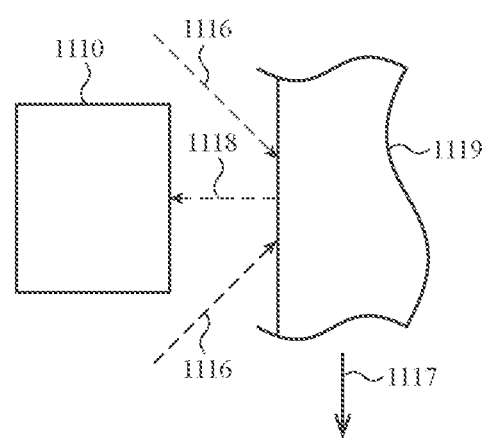

FIG. 11B shows another example optical sensor that includes a light detector 1110 (which may include an image sensor or other light sensing components) that detects reflected ambient light. For example, ambient light 1116 may be reflected by the object 1119 as the object 1119 moves along a direction indicated by arrow 1117, and the light detector 1110 may detect a property of the reflected light 1118 and/or capture images of the object 1119 (illuminated by the ambient light 1116) to sense a speed and/or direction of motion of the object 1119. The sensed speed and/or direction of motion of the object 1119 may then be used to control an operation of the device.

Figure 11C:
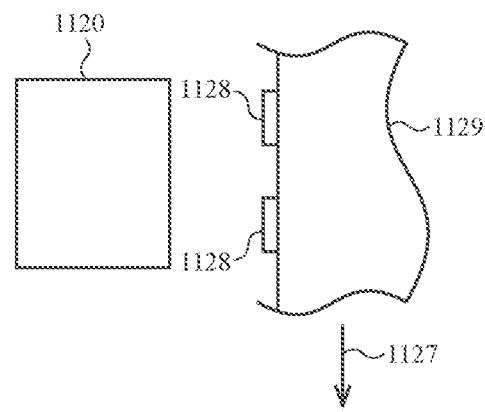

FIG. 11C shows a Hall effect sensor 1120 that may be used to sense changes in a magnetic field produced by motion of an object 1129 (e.g., along a direction 1127). The object 1129 may include magnetic and/or ferromagnetic components 1128 that move relative to the Hall effect sensor 1120 to facilitate the sensing of the motion of the object 1129.

Figure 11D:
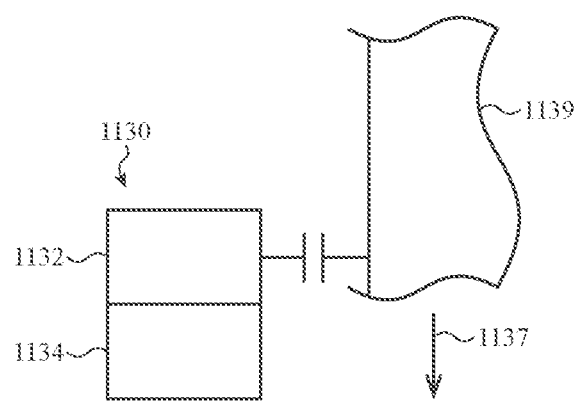

FIG. 11D shows a capacitive sensing element 1130. The capacitive sensing element 1130 may use multiple capacitive sense pixels 1132, 1134 to detect motion of an object 1139. For example, as the object 1139 (e.g., a user's finger) approaches the first capacitive sense pixel 1132, the object 1139 causes a change in capacitance that is detected by the first capacitive sense pixel 1132. As the object 1139 continues to move along the direction 1137, it approaches the second capacitive sense pixel 1134 and causes a change in capacitance that is detected by the second capacitive sense pixel 1134. The change in capacitance detected by the first and second capacitive sense pixels (and optionally additional capacitive sense pixels) as the object 1139 moves may together be used to determine a speed and/or direction of motion of the object 1139, which may in turn be used to control an operation of a device. Where capacitive sense pixels are used to sense motion of an object, they may be part of a sensor that is solely used to sense motion of a finger as it interacts with a crown. In other cases, the capacitive sense pixels may be part of a touch sensor that is also used to detect touch inputs on a touch-screen display, as described above.

Figure 12:
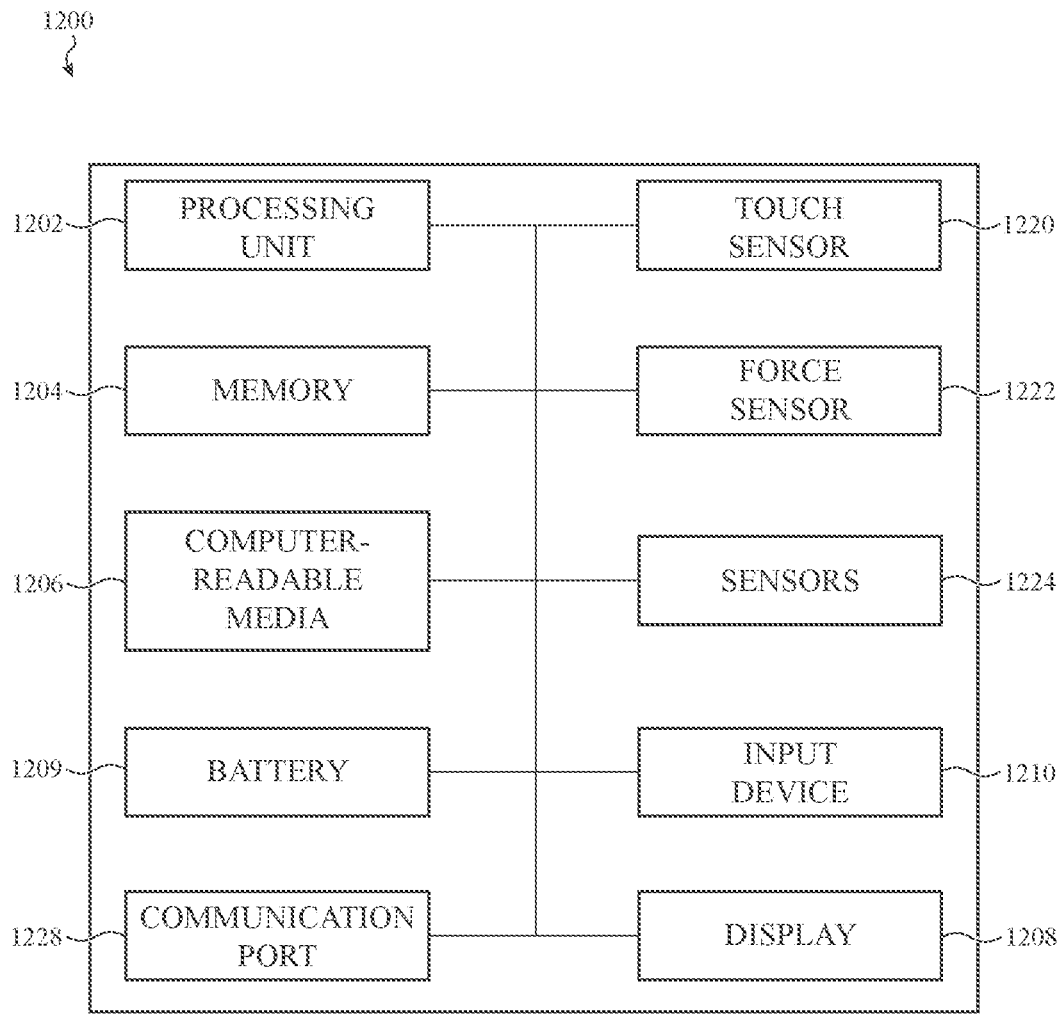
FIG. 12 depicts example components of a wearable electronic device.

FIG. 12 depicts an example schematic diagram of an electronic device 1200. By way of example, the device 1200 of FIG. 12 may correspond to the wearable electronic device 100 shown in FIGS. 1A-1B (or any other wearable electronic device described herein). To the extent that multiple functionalities, operations, and structures are disclosed as being part of, incorporated into, or performed by the device 1200, it should be understood that various embodiments may omit any or all such described functionalities, operations, and structures. Thus, different embodiments of the device 1200 may have some, none, or all of the various capabilities, apparatuses, physical features, modes, and operating parameters discussed herein.

As shown in FIG. 12, a device 1200 includes a processing unit 1202 operatively connected to computer memory 1204 and/or computer-readable media 1206. The processing unit 1202 may be operatively connected to the memory 1204 and computer-readable media 1206 components via an electronic bus or bridge. The processing unit 1202 may include one or more computer processors or microcontrollers that are configured to perform operations in response to computer-readable instructions. The processing unit 1202 may include the central processing unit (CPU) of the device. Additionally or alternatively, the processing unit 1202 may include other processors within the device including application specific integrated chips (ASIC) and other microcontroller devices.

The memory 1204 may include a variety of types of non-transitory computer-readable storage media, including, for example, read access memory (RAM), read-only memory (ROM), erasable programmable memory (e.g., EPROM and EEPROM), or flash memory. The memory 1204 is configured to store computer-readable instructions, sensor values, and other persistent software elements. Computer-readable media 1206 also includes a variety of types of non-transitory computer-readable storage media including, for example, a hard-drive storage device, a solid-state storage device, a portable magnetic storage device, or other similar device. The computer-readable media 1206 may also be configured to store computer-readable instructions, sensor values, and other persistent software elements.

In this example, the processing unit 1202 is operable to read computer-readable instructions stored on the memory 1204 and/or computer-readable media 1206. The computer-readable instructions may adapt the processing unit 1202 to perform the operations or functions described above with respect to FIGS. 1A-11D. In particular, the processing unit 1202, the memory 1204, and/or the computer-readable media 1206 may be configured to cooperate with a sensor 1124 (e.g., a rotation sensor that senses rotation of a crown component or a sensor that senses motion of a user's finger) to control the operation of a device in response to an input applied to a crown of a device (e.g., the crown 112). The computer-readable instructions may be provided as a computer-program product, software application, or the like.

As shown in FIG. 12, the device 1200 also includes a display 1208. The display 1208 may include a liquid-crystal display (LCD), organic light emitting diode (OLED) display, LED display, or the like. If the display 1208 is an LCD, the display 1208 may also include a backlight component that can be controlled to provide variable levels of display brightness. If the display 1208 is an OLED or LED type display, the brightness of the display 1208 may be controlled by modifying the electrical signals that are provided to display elements. The display 1208 may correspond to any of the displays shown or described herein.

The device 1200 may also include a battery 1209 that is configured to provide electrical power to the components of the device 1200. The battery 1209 may include one or more power storage cells that are linked together to provide an internal supply of electrical power. The battery 1209 may be operatively coupled to power management circuitry that is configured to provide appropriate voltage and power levels for individual components or groups of components within the device 1200. The battery 1209, via power management circuitry, may be configured to receive power from an external source, such as an AC power outlet. The battery 1209 may store received power so that the device 1200 may operate without connection to an external power source for an extended period of time, which may range from several hours to several days.

In some embodiments, the device 1200 includes one or more input devices 1210. An input device 1210 is a device that is configured to receive user input. The one or more input devices 1210 may include, for example, a push button, a touch-activated button, a keyboard, a keypad, or the like (including any combination of these or other components). In some embodiments, the input device 1210 may provide a dedicated or primary function, including, for example, a power button, volume buttons, home buttons, scroll wheels, and camera buttons. Generally, a touch sensor or a force sensor may also be classified as an input device. However, for purposes of this illustrative example, the touch sensor 1220 and a force sensor 1222 are depicted as distinct components within the device 1200.

The device 1200 may also include a sensor 1124 that detects inputs provided by a user to a crown of the device (e.g., the crown 112). As described above, the sensor 1124 may include sensing circuitry and other sensing elements that facilitate sensing of rotational motion of a crown component and/or motion of a user's finger that is sliding along a surface of a crown. The sensor 1124 may correspond to the sensors described with respect to FIGS. 11A-11D, or other sensors that may be used to provide the sensing functions described herein.

The device 1200 may also include a touch sensor 1220 that is configured to determine a location of a touch on a touch-sensitive surface of the device 1200 (e.g., an input surface defined by the portion of a cover 108 over a display 109). The touch sensor 1220 may use or include capacitive sensors, resistive sensors, surface acoustic wave sensors, piezoelectric sensors, strain gauges, or the like. In some cases the touch sensor 1220 associated with a touch-sensitive surface of the device 1200 may include a capacitive array of electrodes or nodes that operate in accordance with a mutual-capacitance or self-capacitance scheme. The touch sensor 1220 may be integrated with one or more layers of a display stack (e.g., the display 109) to provide the touch-sensing functionality of a touchscreen. Moreover, the touch sensor 1220, or a portion thereof, may be used to sense motion of a user's finger as it slides along a surface of a crown, as described herein.

The device 1200 may also include a force sensor 1222 that is configured to receive and/or detect force inputs applied to a user input surface of the device 1200 (e.g., the display 109). The force sensor 1222 may use or include capacitive sensors, resistive sensors, surface acoustic wave sensors, piezoelectric sensors, strain gauges, or the like. In some cases, the force sensor 1222 may include or be coupled to capacitive sensing elements that facilitate the detection of changes in relative positions of the components of the force sensor (e.g., deflections caused by a force input). The force sensor 1222 may be integrated with one or more layers of a display stack (e.g., the display 109) to provide force-sensing functionality of a touchscreen.

The device 1200 may also include a communication port 1228 that is configured to transmit and/or receive signals or electrical communication from an external or separate device. The communication port 1228 may be configured to couple to an external device via a cable, adaptor, or other type of electrical connector. In some embodiments, the communication port 1228 may be used to couple the device 1200 to an accessory, including a dock or case, a stylus or other input device, smart cover, smart stand, keyboard, or other device configured to send and/or receive electrical signals.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. A wearable electronic device comprising:
a housing defining a side surface;
a transparent cover coupled to the housing;
a touchscreen display positioned below the cover;
a crown along the side surface of the housing and comprising a rotatable portion defining a sensing surface external to the housing; and
a rotation sensing system configured to sense a movement of the sensing surface as the rotatable portion of the crown is rotated.

2. The wearable electronic device of claim 1, wherein:
the crown further comprises a non-rotatable portion positioned external to the housing; and
the rotation sensing system comprises a sensing element coupled to the non-rotatable portion of the crown.

3. The wearable electronic device of claim 1, further comprising a force sensing system configured to detect a force input applied to the crown.

4. The wearable electronic device of claim 3, further comprising:
a haptic actuator; and
a processing unit configured to cause the haptic actuator to produce a tactile output in response to a determination that the force input satisfies a force condition.

5. The wearable electronic device of claim 4, wherein the haptic actuator is coupled to the non-rotatable portion of the crown.

6. The wearable electronic device of claim 1, wherein the rotation sensing system comprises a sensing element coupled to the housing and configured to optically sense the movement of the sensing surface through an opening in the housing.

7. The wearable electronic device of claim 1, wherein:
the crown further comprises a non-rotatable portion positioned external to the housing; and
the non-rotatable portion defines an exposed end surface of the crown.

8. An electronic watch comprising:
a housing;
a touchscreen display coupled to the housing;
a crown coupled to the housing and comprising:
  a shaft member coupled to the housing and rotationally constrained relative to the housing; and
  a rotatable member coupled to the shaft member and configured to rotate about the shaft member;
a rotation sensing system configured to detect a rotation of the rotatable member; and
a force sensing system configured to detect a force input applied to the crown.

9. The electronic watch of claim 8, wherein:
the housing defines an opening; and
the shaft member extends through the opening and defines an exterior end surface of the crown.

10. The electronic watch of claim 9, wherein the force input is applied to the exterior end surface of the crown.

11. The electronic watch of claim 8, wherein the rotation sensing system comprises an optical sensor coupled to the shaft member and configured to detect the rotation of the rotatable member based on light reflected by the rotatable member.

12. The electronic watch of claim 11, further comprising:
a processing unit within the housing; and
a conductive member extending through the shaft member and conductively coupling the optical sensor to the processing unit.

13. The electronic watch of claim 8, wherein the force sensing system is configured to produce a signal that varies continuously in accordance with a magnitude of the force input.

14. The electronic watch of claim 8, further comprising:
a haptic actuator; and
a processing unit configured to cause the haptic actuator to produce a tactile output in response to a determination that the force input satisfies a force condition.

15. A wearable electronic device comprising:
a housing;
a display at least partially within the housing;
a band coupled to the housing and configured to attach the wearable electronic device to a wearer;
a rotationally fixed crown extending from a side of the housing;
a first sensing system configured to detect a movement of a finger as the finger slides along a surface of the rotationally fixed crown; and
a second sensing system configured to detect a force resulting from an axial input applied to an end surface of the rotationally fixed crown.

16. The wearable electronic device of claim 15, wherein the first sensing system comprises an optical sensing system positioned in the rotationally fixed crown and configured to detect the movement of the finger based at least in part on light reflected from the finger.

17. The wearable electronic device of claim 16, further comprising:
a processing unit within the housing; and
a conductive member extending through the rotationally fixed crown and conductively coupling the optical sensing system to the processing unit.

18. The wearable electronic device of claim 15, wherein the second sensing system comprises a force sensing system configured to produce a signal that varies continuously in accordance with a magnitude of the axial input.

19. The wearable electronic device of claim 15, wherein the first sensing system comprises an optical sensing system positioned in the housing and configured to detect the movement of the finger based at least in part on light reflected from the finger.

20. The wearable electronic device of claim 15, further comprising:
a haptic actuator; and
a processing unit configured to cause the haptic actuator to produce a tactile output in response to a determination that the axial input satisfies a force condition, the tactile output detectable at the end surface of the rotationally fixed crown.

* * * * *